(12) United States Patent
Raghavan et al.

(10) Patent No.: US 12,284,013 B2
(45) Date of Patent: Apr. 22, 2025

(54) PERCEPTION-ASSISTED BEAM MANAGEMENT PROCEDURES

(71) Applicant: QUALCOMM Incorporated, San Diego, CA (US)

(72) Inventors: Vasanthan Raghavan, West Windsor Township, NJ (US); Kapil Gulati, Belle Mead, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 17/662,824

(22) Filed: May 10, 2022

(65) Prior Publication Data

US 2023/0370131 A1    Nov. 16, 2023

(51) Int. Cl.
*H04B 7/06* (2006.01)
*H04L 5/00* (2006.01)

(52) U.S. Cl.
CPC ......... *H04B 7/0617* (2013.01); *H04B 7/0686* (2013.01); *H04L 5/0048* (2013.01)

(58) Field of Classification Search
CPC .... H04B 7/0617; H04B 7/0686; H04L 5/0048
USPC ........................................................ 370/329
See application file for complete search history.

(56) References Cited

U.S. PATENT DOCUMENTS

| | | | |
|---|---|---|---|
| 10,666,342 B1* | 5/2020 | Landis ................ | H04B 17/318 |
| 2017/0302355 A1* | 10/2017 | Islam .................. | H04B 7/0639 |
| 2018/0063693 A1* | 3/2018 | Chakraborty ........ | H04W 8/005 |
| 2020/0280378 A1* | 9/2020 | Hwang ............... | H04B 17/309 |
| 2022/0376768 A1* | 11/2022 | Harrebek ............. | H04B 7/088 |
| 2023/0254815 A1* | 8/2023 | Khoshnevisan ...... | H04L 5/0053 |
| | | | 370/329 |

OTHER PUBLICATIONS

International Search Report and Written Opinion—PCT/US2023/017901—ISA/EPO—Jun. 27, 2023.

* cited by examiner

*Primary Examiner* — Charles N Appiah
*Assistant Examiner* — Frank E Donado
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a network entity, an indication of whether the UE is capable of performing a perception-assisted beam management procedure. The UE may receive, from the network entity, a configuration indicating whether the UE should perform the perception-assisted beam management procedure based at least in part on the indication of whether the UE is capable of performing the perception-assisted beam management procedure. Numerous other aspects are described.

24 Claims, 13 Drawing Sheets

PERCEPTION-ASSISTED BEAM MANAGEMENT PROCEDURES

FIELD OF THE DISCLOSURE

Aspects of the present disclosure generally relate to wireless communication and to techniques and apparatuses for perception-assisted beam management procedures.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting, to a network entity, an indication of whether the UE is capable of performing a perception-assisted beam management procedure. The method may include receiving, from the network entity, a configuration indicating whether the UE should perform the perception-assisted beam management procedure based at least in part on the indication of whether the UE is capable of performing the perception-assisted beam management procedure.

Some aspects described herein relate to a method of wireless communication performed by a network entity. The method may include receiving, from a UE, an indication of whether the UE is capable of performing a perception-assisted beam management procedure. The method may include transmitting, to the UE, a configuration indicating whether the UE should perform the perception-assisted beam management procedure based at least in part on the indication of whether the UE is capable of performing the perception-assisted beam management procedure.

Some aspects described herein relate to an apparatus for wireless communication at UE. The apparatus may include a memory and one or more processors coupled to the memory. The one or more processors may be configured to transmit, to a network entity, an indication of whether the UE is capable of performing a perception-assisted beam management procedure. The one or more processors may be configured to receive, from the network entity, a configuration indicating whether the UE should perform the perception-assisted beam management procedure based at least in part on the indication of whether the UE is capable of performing the perception-assisted beam management procedure.

Some aspects described herein relate to an apparatus for wireless communication at a network entity. The apparatus may include a memory and one or more processors coupled to the memory. The one or more processors may be configured to receive, from a UE, an indication of whether the UE is capable of performing a perception-assisted beam management procedure. The one or more processors may be configured to transmit, to the UE, a configuration indicating whether the UE should perform the perception-assisted beam management procedure based at least in part on the indication of whether the UE is capable of performing the perception-assisted beam management procedure.

Some aspects described herein relate to a non-transitory computer-readable medium that stores a set of instructions for wireless communication by a UE. The set of instructions, when executed by one or more processors of the UE, may cause the UE to transmit, to a network entity, an indication of whether the UE is capable of performing a perception-assisted beam management procedure. The set of instructions, when executed by one or more processors of the UE, may cause the UE to receive, from the network entity, a configuration indicating whether the UE should perform the perception-assisted beam management procedure based at least in part on the indication of whether the UE is capable of performing the perception-assisted beam management procedure.

Some aspects described herein relate to a non-transitory computer-readable medium that stores a set of instructions for wireless communication by a network entity. The set of instructions, when executed by one or more processors of the network entity, may cause the network entity to receive, from a UE, an indication of whether the UE is capable of performing a perception-assisted beam management procedure. The set of instructions, when executed by one or more processors of the network entity, may cause the network entity to transmit, to the UE, a configuration indicating whether the UE should perform the perception-assisted beam management procedure based at least in part on the indication of whether the UE is capable of performing the perception-assisted beam management procedure.

Some aspects described herein relate to an apparatus for wireless communication. The apparatus may include means for transmitting, to a network entity, an indication of whether the apparatus is capable of performing a perception-assisted beam management procedure. The apparatus may include means for receiving, from the network entity, a configuration indicating whether the apparatus should perform the perception-assisted beam management procedure based at least in part on the indication of whether the apparatus is capable of performing the perception-assisted beam management procedure.

Some aspects described herein relate to an apparatus for wireless communication. The apparatus may include means for receiving, from a UE, an indication of whether the UE is capable of performing a perception-assisted beam management procedure. The apparatus may include means for transmitting, to the UE, a configuration indicating whether the UE should perform the perception-assisted beam management procedure based at least in part on the indication of whether the UE is capable of performing the perception-assisted beam management procedure.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
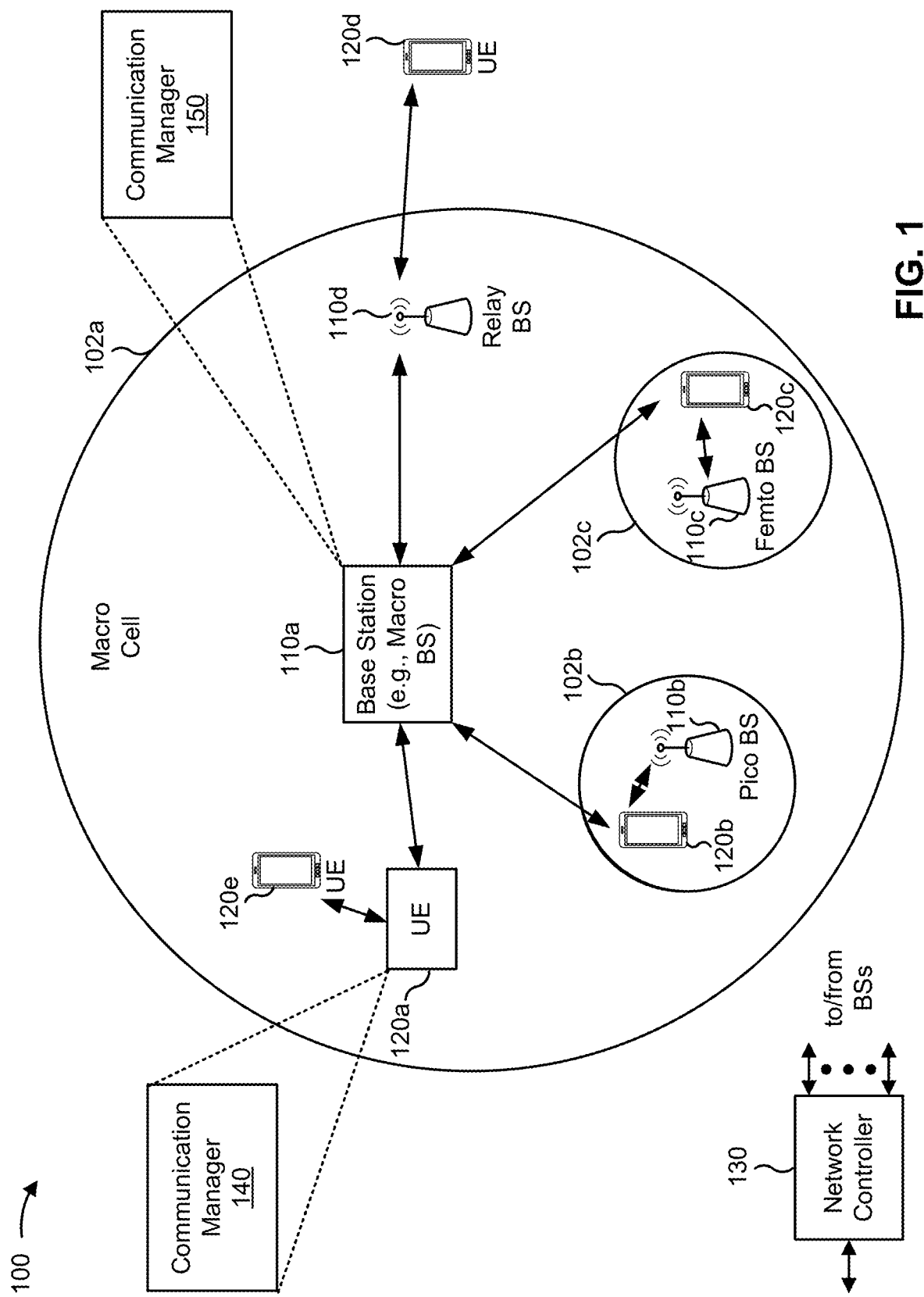
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although the base station 110 is shown as an integral unit in FIG. 1, aspects of the disclosure are not so limited. In some other aspects, the functionality of the base station 110 may be disaggregated according to an open radio access network (O-RAN) architecture or the like, which will be described in more detail in connection with FIG. 3. In some aspects, the "network entity" described herein may refer to the base station 110 or one or more disaggregated portions of the base station 110. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a network entity, an indication of whether the UE 120 is capable of performing a perception-assisted beam management procedure; and receive, from the network entity, a configuration indicating whether the UE 120 should perform the perception-assisted beam management procedure based at least in part on the indication of whether the UE 120 is capable of performing the perception-assisted beam management procedure. Additionally, or alternatively, the communication manager 140 may perform one or more other operations described herein.

In some aspects, the network entity described herein may be associated with the base station 110 (e.g., may be the base station 110 or may be one or more disaggregated portions of the base station 110). The network entity may include a communication manager 150. As described in more detail elsewhere herein, the communication manager 150 may receive, from a UE (e.g., UE 120), an indication of whether the UE is capable of performing a perception-assisted beam management procedure; and transmit, to the UE, a configuration indicating whether the UE should perform the perception-assisted beam management procedure based at least in part on the indication of whether the UE is capable of performing the perception-assisted beam management procedure. Additionally, or alternatively, the communication manager 150 may perform one or more other operations described herein.

As indicated above, FIG. 1 is provided as an example. Other examples may differ from what is described with regard to FIG. 1.

Figure 2:
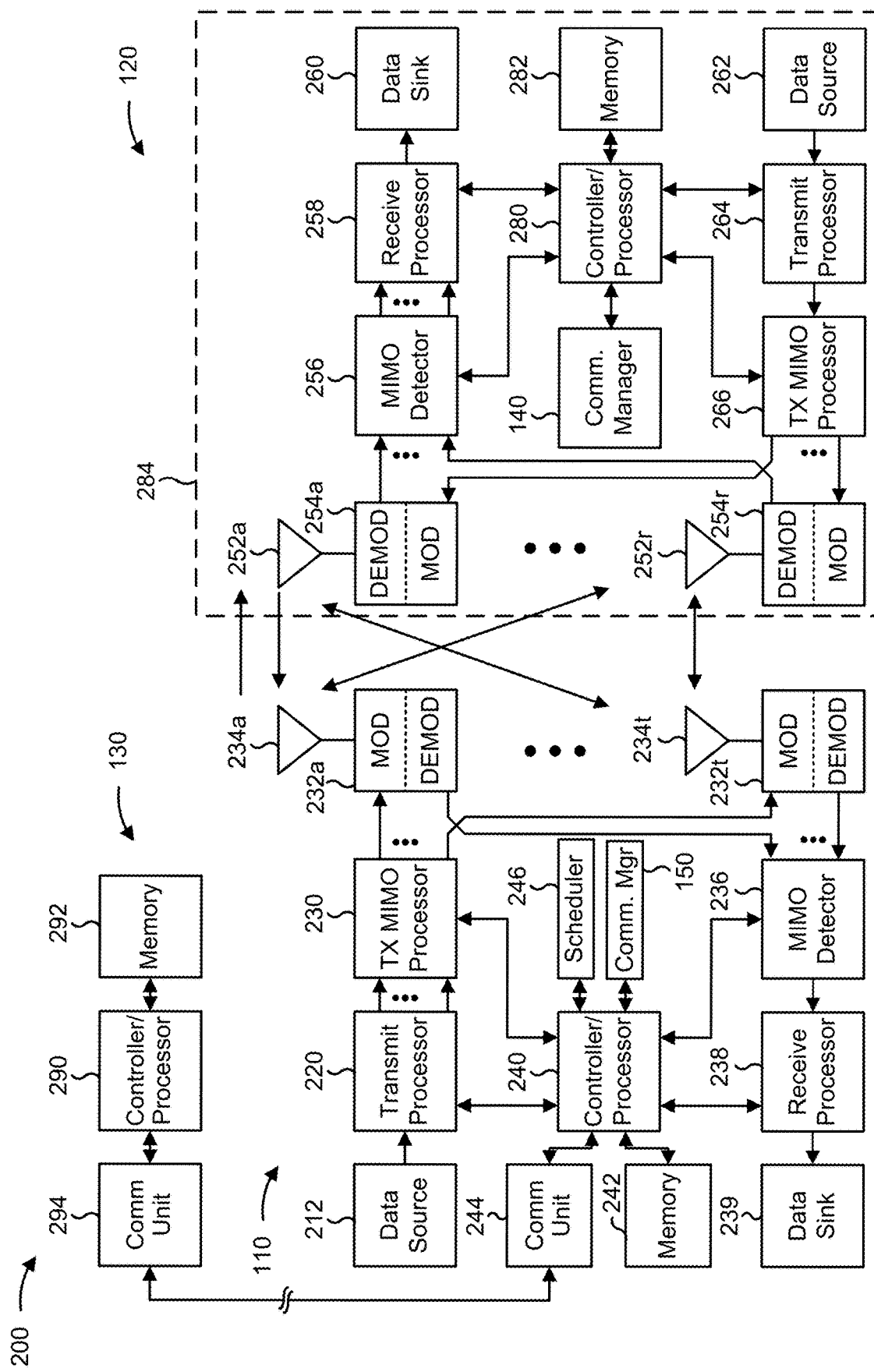
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-13).

The controller/processor 240 of the base station 110, the controller/processor 280 of the UE 120, and/or any other component(s) of FIG. 2 may perform one or more techniques associated with perception-assisted beam management procedures, as described in more detail elsewhere herein. In some aspects, the network entity described herein is the base station 110, is included in the base station 110, or includes one or more components of the base station 110 shown in FIG. 2. The controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
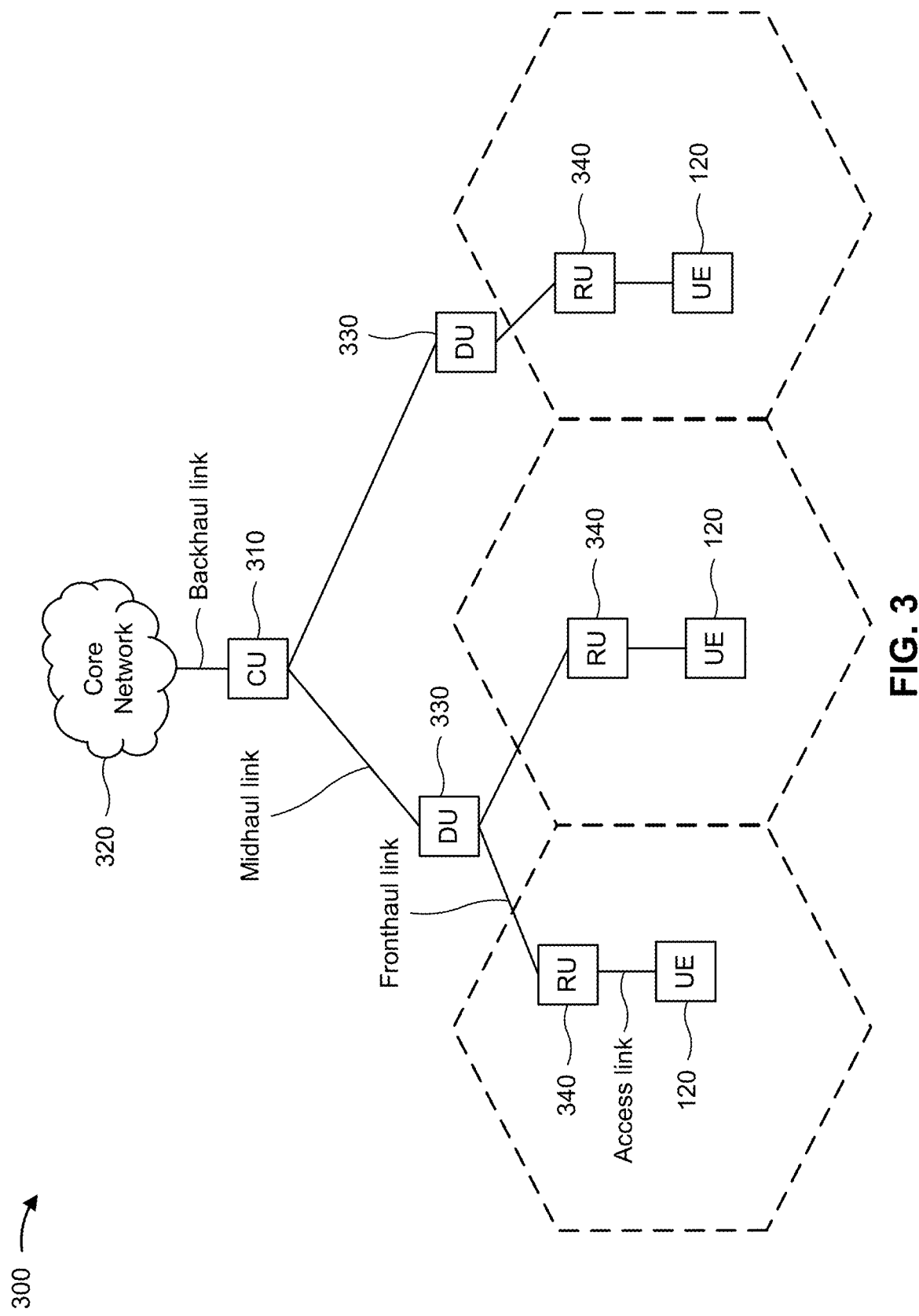
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a centralized unit (CU) 310 that communicates with a core network 320 via a backhaul link. Furthermore, the CU 310 may communicate with one or more distributed units (DUs) 330 via respective midhaul links. The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
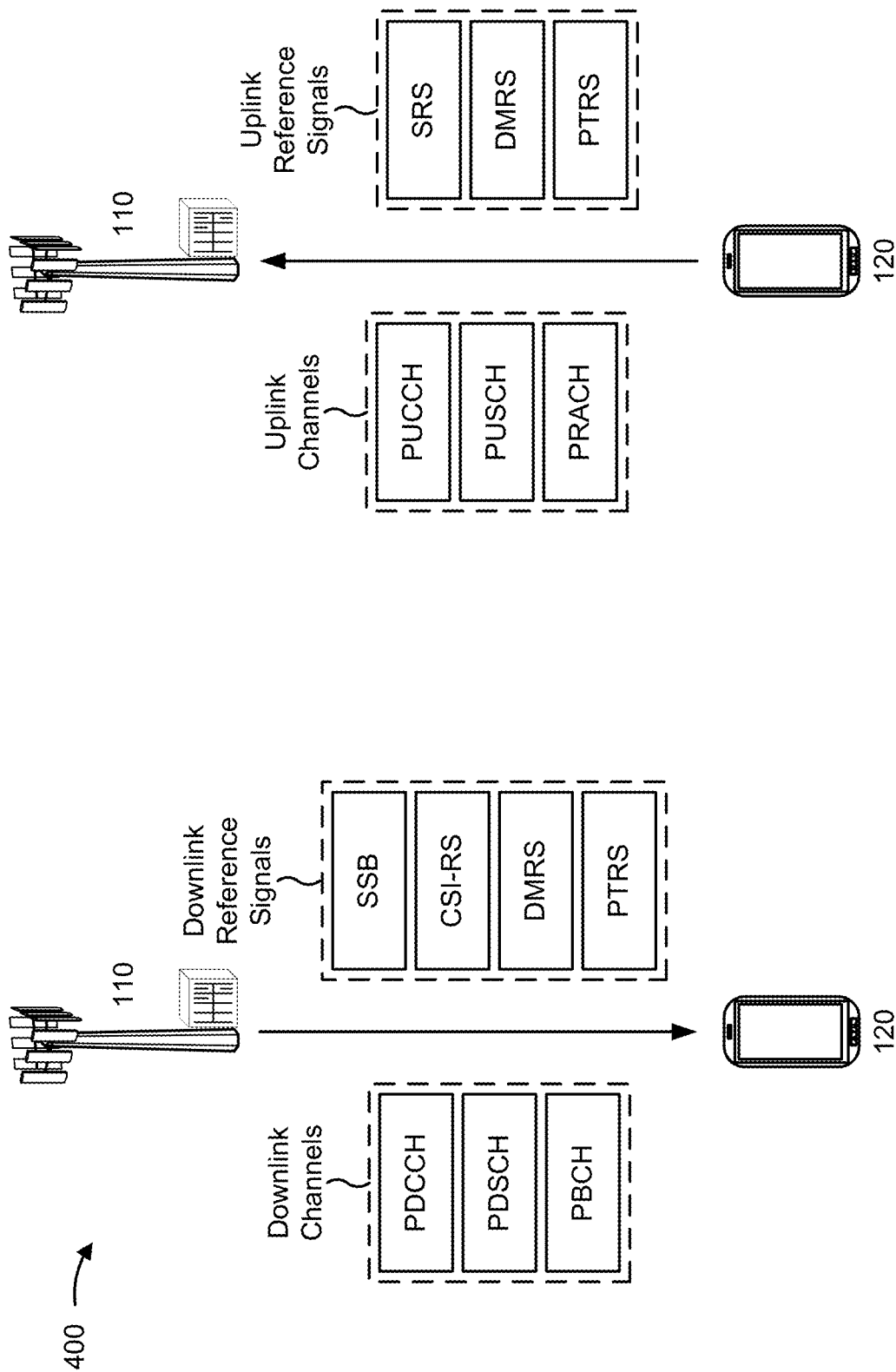
FIG. 4 is a diagram illustrating an example of physical channels and reference signals in a wireless network, in accordance with the present disclosure.

FIG. 4 is a diagram illustrating an example 400 of physical channels and reference signals in a wireless network, in accordance with the present disclosure. As shown in FIG. 4, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error. As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120. Aspects of CSI-RS and/or SRS beam management procedures are described in more detail in connection with FIG. 5.

As indicated above, FIG. 4 is provided as an example. Other examples may differ from what is described with regard to FIG. 4.

Figure 5:
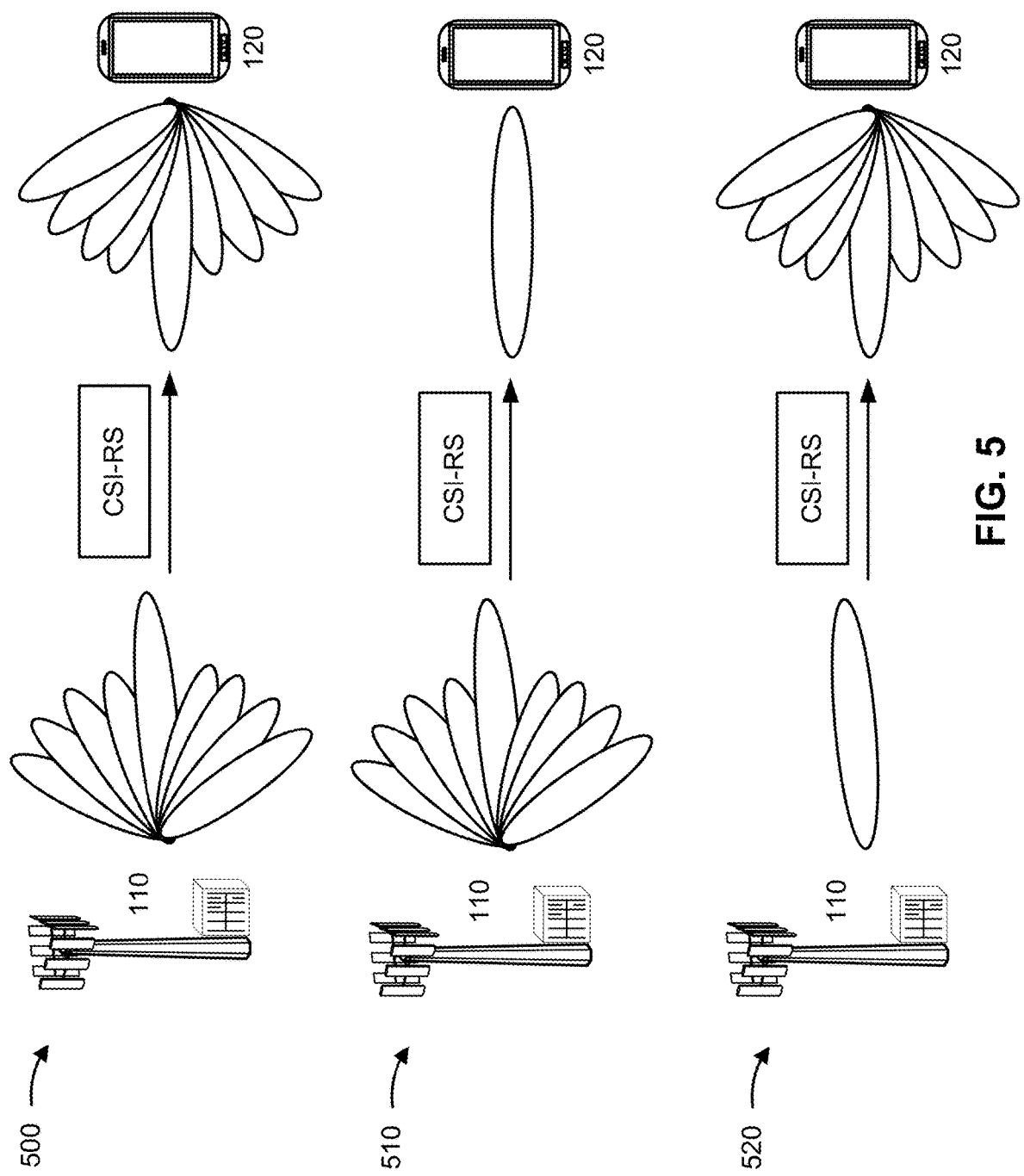
FIG. 5 is a diagram illustrating examples of channel state information reference signal beam management procedures, in accordance with the present disclosure.

FIG. 5 is a diagram illustrating examples 500, 510, and 520 of CSI-RS beam management procedures, in accordance with the present disclosure. As shown in FIG. 5, examples 500, 510, and 520 include a UE 120 in communication with a base station 110 in a wireless network (e.g., wireless network 100). However, the devices shown in FIG. 5 are provided as examples, and the wireless network may support communication and beam management between other devices (e.g., between a UE 120 and a base station 110 or a TRP, between a mobile termination node and a control node, between an integrated access and backhaul (IAB) child node and an IAB parent node, and/or between a scheduled node and a scheduling node). In some aspects, the UE 120 and the base station 110 may be in a connected state (e.g., an RRC connected state).

As shown in FIG. 5, example 500 may include a base station 110 and a UE 120 communicating to perform beam management using CSI-RSs. Example 500 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 5 and example 500, CSI-RSs may be configured to be transmitted from the base station 110 to the UE 120. The CSI-RSs may be configured to be periodic (e.g., using RRC signaling), semi-persistent (e.g., using MAC control element (MAC-CE) signaling), and/or aperiodic (e.g., using DCI).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 500 has been described in connection with CSI-RSs, the first beam management process may also use SSBs for beam management in a similar manner as described above.

As shown in FIG. 5, example 510 may include a base station 110 and a UE 120 communicating to perform beam management using CSI-RSs. Example 510 depicts a second beam management procedure (e.g., P2 CSI-RS beam management). The second beam management procedure may be referred to as a beam refinement procedure, a base station beam refinement procedure, a TRP beam refinement procedure, and/or a transmit beam refinement procedure. As shown in FIG. 5 and example 510, CSI-RSs may be configured to be transmitted from the base station 110 to the UE 120. The CSI-RSs may be configured to be aperiodic (e.g., using DCI). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 5, example 520 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 5 and example 520, one or more CSI-RSs may be configured to be transmitted from the base station 110 to the UE 120. The CSI-RSs may be configured to be aperiodic (e.g., using DCI). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

The beam management examples described above may be referred to as static beam management procedures or static beam weighting. More particularly, to select the transmit and/or receive beam, the UE 120 or the base station 110 may steer energy in specific directions of beamspace, resulting in what are sometimes referred to as directional beams. To create such directional beams, the UE 120 and/or the base station 110 may select beam weights from a static codebook stored in memory, such as within a radio frequency integrated circuit (RFIC) memory. Put another way, in some aspects, beam weights may not be changed dynamically beyond what is stored in the RFIC memory (e.g., during the beam selection process), but instead may only be selected from one of multiple options residing in the static codebook.

In some cases, it may be beneficial to implement adaptive or dynamic beam weighting, rather than static beam weighting. Adaptive beam weighting may result in certain beam management improvements, such as covering or capturing the energy from a wider angular spread with the same cluster, providing multi-beam effects such as multiple lobes across multiple clusters, performing improved side lobe control, managing blocked beams resulting from hand blockage and related impairments, managing polarization-specific impairments at the UE 120 due to the UE 120 housing, materials, sensors, or the like, and similar benefits. In contrast to static beam weights, which may be designed a priori, adaptive beam weights may be learned in real time (or, put another way, adaptive beam weights may be learned on-the-fly). Aspects of adaptive beam weighting are described in more detail in connection with FIG. 6.

As indicated above, FIG. 5 is provided as an example of beam management procedures. Other examples of beam management procedures may differ from what is described with respect to FIG. 5. For example, the UE 120 and the base station 110 may perform the third beam management procedure before performing the second beam management procedure, and/or the UE 120 and the base station 110 may perform a similar beam management procedure to select a UE transmit beam.

Figure 6:
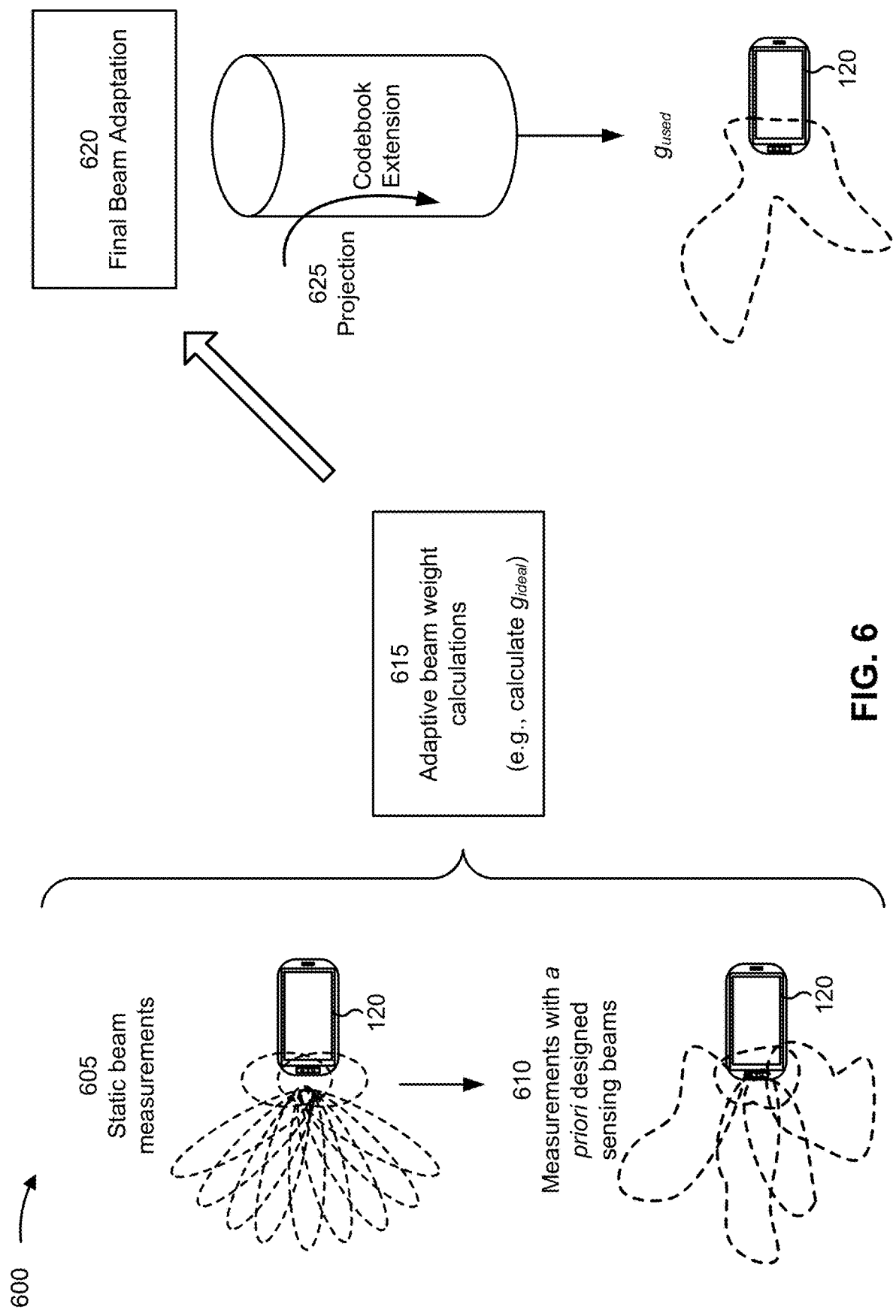
FIG. 6 is a diagram illustrating an example associated with adaptive beam weight learning procedures, in accordance with the present disclosure.

FIG. 6 is a diagram illustrating an example 600 associated with adaptive beam weight learning procedures, in accordance with the present disclosure.

At a high level, adaptive beam weight learning may be based at least in part on the use of a specific set of beam weights for channel sounding. In some aspects, the specific set of beam weights may be a priori designed with a specific objective different from adaptive beam weight learning, such as for use in the static beam weight learning procedures described in connection with FIG. 5. A network device (such as the UE 120 shown in FIG. 6, but which in other instances may be a different network device) may perform certain measurements, such as RSRP measurements, using the set of beam weights. In this regard, the UE 120 may learn beam weights to use for reception and/or transmission, and/or may estimate a channel matrix between a network entity transmitting the reference signals (e.g., CSI-RSs and/or SSBs) and the UE 120, which may be a superposition of all reflecting objects in the environment, or the like. In some aspects, the UE 120 may treat the channel estimation process as a stochastic process and thus learn statistics associated with the stochastic process, and may derive a covariance matrix associated with the stochastic process. In some aspects, the UE 120 may update beam weights as the channel environment changes due to blockages, fading, or the like. In some aspects, the adaptive and/or dynamic beam weights may correspond to a dominant eigenvector of the channel covariance matrix estimated by the UE 120.

More particularly, and as shown by reference number 605, the UE 120 may sample the channel (e.g., perform channel sounding) using a set of sampling beams (which may sometimes herein be referred to as static beams and/or a priori beams), which may correspond to the static beams described in connection with FIG. 5. The static or sampling beams may be directional beams pointing in various directions, as shown, or other well-designed beams sharing a unitary or a quasi-unitary structure. In some aspects, the UE 120 may perform RSRP or similar measurements using the sampling beams. More particularly, and as shown by reference number 610, the UE 120 may perform RSRP or similar measurements on SSBs and/or CSI-RSs received using the sampling beams.

As shown by reference number 615, based at least in part on the measurements, the UE 120 may perform adaptive beam weight calculations. As described above, in some aspects, this may include determining a dominant eigenvector of a channel covariance matrix estimated by the UE 120 from the measurements associated with the a priori designed sensing beams. In some aspects, the dynamic beam weights and/or the dominant eigenvector associated with the adaptive beam weights may be referred to as $g_{ideal}$.

As shown by reference number 620, the UE 120 may perform final beam adaptation, which may include performing certain additional calculations and/or determinations to derive the adaptive beam weights that are used by the UE 120. For example, in some aspects, the adaptive beam weights ultimately implemented by the UE 120 may be constrained in terms of quantization for phases and amplitudes, or the like. Thus, the UE 120, as shown by reference number 625, may project the adaptive beam weights (e.g., the eigenvector, $g_{ideal}$) onto a codebook extension, which may include various beam weight matrices or the like stored in a memory of the RFIC. This may result in the UE 120 implementing a matrix, $g_{used}$, selected from the codebook extension. For example, as shown in FIG. 6, the $g_{used}$ may result in a beam pointing in two different directions simultaneously. This may be beneficial for receiving a signal that is reflected in two different directions or the like, because both reflection paths may be received by UE 120, resulting in a boost of signal energy at the UE 120. Put another way, the adaptive beam weight learning procedure shown in FIG. 6 may result in the UE 120 collecting energy in multiple directions and/or dimensions, resulting in improved signal quality at the UE 120.

Performing adaptive beam weight learning, such as performing the adaptive beam weight learning procedure described in connection with FIG. 6, may result in certain drawbacks, however. For example, a number of reference signals (e.g., CSI-RSs and/or SSBs) needed to perform the adaptive beam weight learning procedure may be greater than a number of reference signals needed to perform static beam weighting. For example, in some aspects, to perform adaptive beam weighting the number of reference signals needed is proportional to $N^2$, where N corresponds to the number of antenna elements at the device performing the adaptive beam weighting procedure (e.g., the UE 120). Thus, the number of reference signals required to perform an adaptive beam weighting procedure may become onerous as the number of antenna elements increase on a UE 120. For example, UEs 120 or network entities operating in high-frequency bands such as millimeter wave and higher bands may be spaced at relatively smaller distances to create coherent combining at the high-frequencies, thus resulting in numerous antenna elements included in an antenna array. The numerous antenna elements may thus require quadratically more reference signaling to perform adaptive beam weight learning than is needed for UEs with smaller antenna arrays. For example, to perform certain adaptive beam weight learning procedures, a network device such as a Customer Premises Equipment (CPE), which may have an antenna array including 64 antenna elements, would require 4,096 reference signals (e.g., CSI-RSs or SSBs). Accordingly, in some cases, if the number of reference signals becomes too onerous, a UE 120 or other network device may forego the benefits associated with adaptive beam learning and instead perform static beam weighting procedures. Alternatively, a UE 120 or other network device may nonetheless implement adaptive beam weighting procedures, but at a cost of increased reference signaling overhead and associated sampling time, leading to reduced throughput and thus higher latency, and overall inefficient usage of network resources.

Some techniques and apparatuses described herein enable adaptive beam weighting or similar beam management procedures based at least in part on perception-based inferencing or the like. In that regard, the adaptive beam weight learning process may be implemented using a reduced number of reference signals and/or a smaller codebook extension, reducing signaling overhead as well as sampling and computation time. For example, a UE (e.g., UE 120) may transmit, to a network entity (e.g., a base station 110 or one or more functional components thereof), an indication of whether the UE is capable of performing a perception-assisted beam management procedure, such as a perception-assisted beam management procedure associated with an adaptive beam weight learning procedure. In response to the UE indicating that the UE is capable of performing the perception-assisted beam management procedure, the network entity may configure the UE to perform the perception-assisted beam management procedures, such as by performing an adaptive beam weight learning procedure based at least in part on a reduced number of reference signals as compared to a non-perception-assisted beam management procedure, or the like. As a result of implementing a perception-assisted beam management procedure, the UE and/or the network entity may conserve computing, power, network, and/or communication resources that may have otherwise been consumed using conventional beam management procedures. For example, based at least in part on the UE and/or the network entity using a perception-assisted beam management procedure, the UE and/or the network entity may perform beam management procedures based at least in part on reduced reference signaling and/or reduced consumption of computing and power resources associated with quantizing beam weights to a codebook extension, thereby resulting in increased throughput and reduced latency, and overall efficient usage of computing, power, network, and/or communication resources.

As indicated above, FIG. 6 is provided as an example. Other examples may differ from what is described with regard to FIG. 6.

Figure 7:
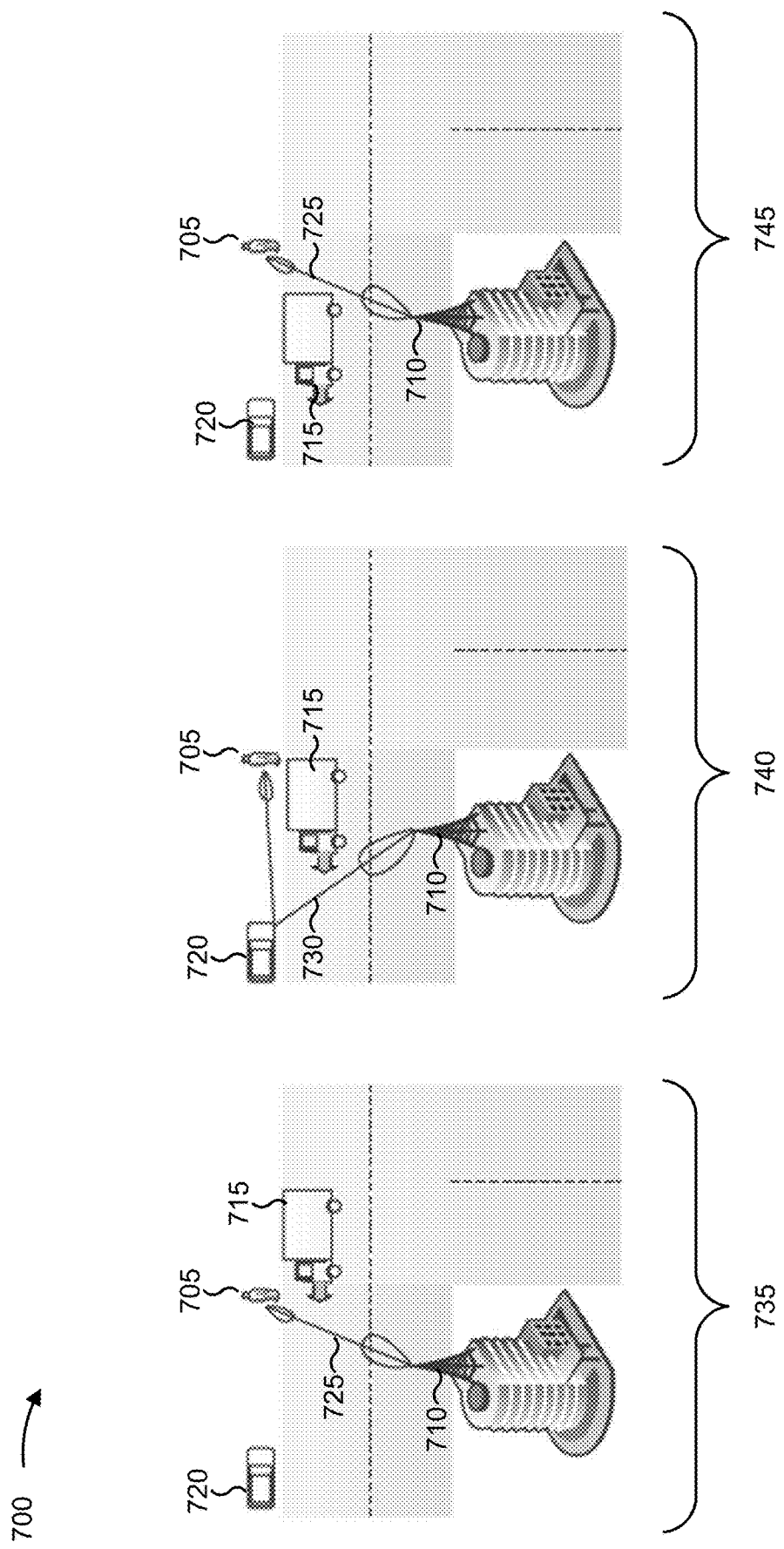
FIG. 7 is a diagram illustrating an example associated with perception-assisted sensing, in accordance with the present disclosure.

FIG. 7 is a diagram illustrating an example 700 associated with perception-assisted sensing, in accordance with the present disclosure.

In some aspects, a UE 120 or other network device may sense features of a surrounding physical environment to improve communication with a network entity (e.g., a base station 110, a CU 310, a DU 330, and RU 340, or the like) or other network device, such as another UE 120. More particularly, in some aspects, a UE 120 or other network device may utilize on-board sensors such as cameras, other optical sensors, or the like to sense changes in the surrounding environment in order to predict line of sight (LOS) blockages or similar blockages or impairments. In some aspects, vehicles and roadside units (RSUs) may be good candidates for performing perception-assisted sensing, because vehicles and/or RSUs may be associated with always-on sensors, may be associated with a known location and/or orientation, and/or may be capable of performing street-level sensing, where a surrounding physical environment is likely to constantly change. Perception-assisted sensing may be particularly useful in high frequency bands (e.g., millimeter wave bands, or the like), in which the high-frequency waves may be more impacted by environmental changes. In some aspects, perception-assisted sensing may be implemented for purposes of handover prediction, predictive rate adaptation, robust radio frequency fingerprinting in dynamic environments, dynamic network management, and/or CSI compression. Additionally, or alternatively, perception-assisted sensing may be implemented for purposes of adaptive beam management.

For example, as shown in FIG. 7, a UE 705 (e.g., UE 120) may utilize perception-assisted sensing for purposes of adaptive beam management. In the example shown in FIG. 7, the UE 705 may be in communication with a network entity 710 (e.g., a base station 110, a CU 310, a DU 330, and RU 340, or a similar network entity). The UE 705 and/or the network entity 710 may include one or more on-board sensors capable of sensing the surrounding physical environment. For example, the UE 705 and/or the network entity 710 may include one or more cameras and/or other optical sensors capable of sensing surrounding vehicles (such as a first vehicle 715 and a second vehicle 720 and movements thereof) and/or other environmental features.

In some aspects, the UE 705 and the network entity 710 may be initially communicating via a first beam 725 or beam path. However, one or more on-board cameras or other sensors at the UE 705 and/or the network entity 710 may sense that the first beam 725 may soon become blocked or otherwise obstructed. Thus, based at least in part on the sensor data (e.g., that the first beam 725 may soon become blocked or otherwise obstructed), the UE 705 and the network entity 710 may switch to communicating via a second beam 730 or beam path that remains unobstructed.

More particularly, at a first time, indicated by reference number 735, the UE 705 and the network entity 710 may communicate via the first beam 725, which may follow a LOS path between the UE 705 and the network entity 710. Based at least in part on the UE 705 and/or the network entity 710 sensing that the first vehicle 715 is moving towards the LOS path, however, the UE 705 and the network entity 710 may switch to a different beam or path. Thus, at a second time, indicated by reference number 740, when the first vehicle is blocking the LOS path and thus the path of the first beam 725, the UE 705 and the network entity 710 may communicate via the second beam 730, which may not be blocked by the first vehicle or other environmental obstruction. In the depicted example, the second beam 730 follows a path that reflects off the second vehicle 720. In this regard, because the second beam 730 is a reflected beam, it may be a less preferable communication beam than a LOS beam (e.g., the first beam 725), when available, but may be more preferable than a blocked LOS path, which may completely disrupt coverage and/or performance.

Thus, at a third time, indicated by reference number 745, when the LOS path may once again become unobstructed, the UE 705 and/or the network entity 710 may sense that the LOS path is once again unobstructed, and thus resume communications via the LOS path (e.g., the first beam 725). In this regard, cameras and sensors at various network devices can assist wireless communications with the goal of beam establishment, beam switching, and beam recovery. Moreover, in some aspects, perception-assisted sensing may be further utilized for purposes of improving adaptive beam weight learning, such as improving the adaptive beam weight learning procedures described in connection with FIG. 6. Aspects of perception-assisted adaptive beam weight learning procedures are described in more detail in connection with FIG. 7.

As indicated above, FIG. 7 is provided as an example. Other examples may differ from what is described with regard to FIG. 7.

Figure 8:
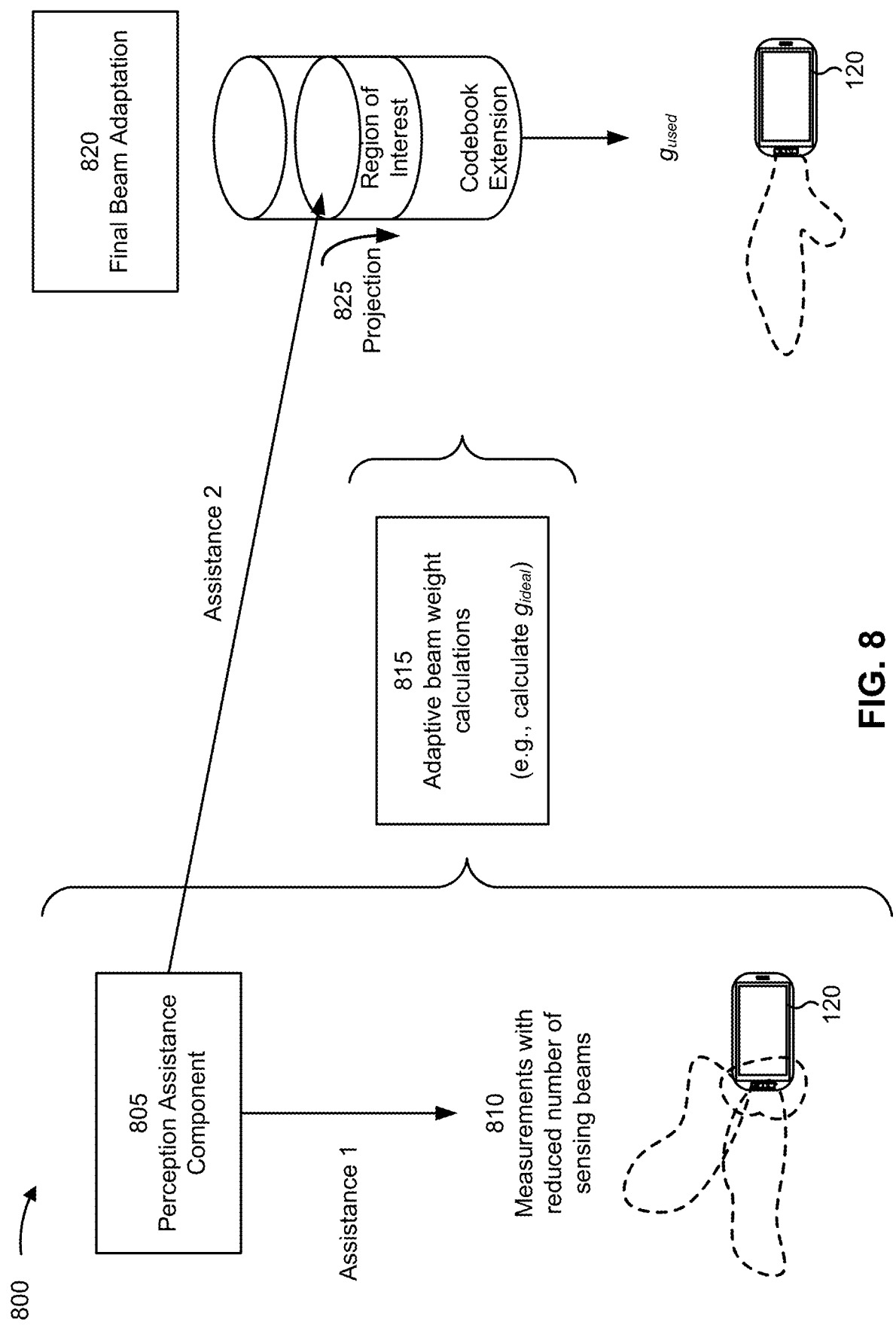
FIG. 8 is a diagram illustrating an example associated with perception-assisted adaptive beam weight learning, in accordance with the present disclosure.

FIG. 8 is a diagram illustrating an example 800 associated with perception-assisted adaptive beam weight learning, in accordance with the present disclosure.

As described above in connection with FIG. 6, adaptive beam weight learning may be relatively slow and require onerous signaling overhead, because the number of reference signals required to perform such procedures may increase quadratically as a number of antenna elements increases (e.g., the reference signaling required may be proportional to $N^2$). In some aspects, perception-assisted adaptive beam weight learning procedures may be implemented in order to speed up adaptive beam weight learning and/or to reduce signaling overhead associated with adaptive beam weight learning. Perception-assisted adaptive beam weight learning procedures may do so utilizing sensor input to reduce the beamspace that must be searched to arrive at the adaptive beam weights, resulting in a reduced number of reference signals and/or a reduced codebook extension to be searched for final beam adaptation.

More particularly, a UE 120 (e.g., the UE 705) may include a perception assistance component 805. The perception assistance component 805 may utilize input from one or more sensors onboard the UE 120 and/or other network devices (e.g., the network entity 710) to reduce a number of sensing beams and/or reduce a codebook space searched by the UE 120 during final beam adaptation. More particularly, as shown by the arrow labeled "Assistance 1" in FIG. 8, the perception assistance component 805 may reduce a number of sensing beams such that the UE 120 may only need to perform beam measurements (e.g., RSRP measurements) in directions most likely to have the greatest signal strength, while ignoring directions that may be adversely impacted by environmental obstacles, such as the first vehicle 715 described in connection with FIG. 7.

More particularly, in some aspects, perception-assisted adaptive beam weight learning procedures may result in using a reduced number of sensing beams in beam training (such as the sensing beams described in connection with reference numbers 605 and 610). For example, using on-board cameras and/or other sensors, a UE 120 (e.g., UE 705) or other network device (e.g., network entity 710) may sense which paths are likely to provide the best coverage, resulting in the UE 120 or other network device searching a reduced dimensional subspace spanned by the paths. For example, in the example described in connection with FIG. 7, the UE 705 may not search the dimensional subspace associated with the LOS path or related paths when the first vehicle 715 is blocking the LOS path, and the UE 705 may instead search a reduced dimensional subspace associated with a reflected path off the second vehicle 720, resulting in reduced reference signaling from the network entity 710 and/or reduced computation at the UE 705. The reduction in reference signaling may result in a reduced power consumption by the UE 705 and/or the network entity 710, a more manageable thermal profile and/or thermal overhead by the UE 705 and/or the network entity 710, and/or a better ability to track beams because a smaller number of reference signals (e.g., CSI-RSs and/or SSBs) are needed for better quality estimates.

Thus, and as shown by reference number 810, the UE 120 may perform measurements (e.g., RSRP measurements), using the reduced number of sensing beams. In this regard, the perception assistance component 805 may beneficially reduce the sampling beams (and thus the corresponding reference signals) to a smaller set without losing any relevant information, because the unused beams may be blocked or otherwise be unusable, as indicated by the various on-board sensors at the UE 120 and/or other network devices. As shown by reference number 815, the UE 120 may then perform adaptive beam weight calculations using the reduced number of measurements to determine $g_{ideal}$ (e.g., the UE 120 may use the reduced number of measurements to determine a dominant eigenvector of the channel covariance matrix estimated by the UE 120).

Moreover, in some aspects, the perception assistance component 805 may reduce a search space for the codebook extension, which corresponds to the space of quantizations (e.g., amplitudes and phases) to search for the final adaptive beam weights. This may reduce projection complexity, including reducing storage of the reduced space in RFIC memory or the like, as well as reducing computational complexity in projection over a smaller codebook subset.

More particularly, and as shown by the arrow labeled as "Assistance 2" in FIG. 8, based at least in part on on-board sensor data or the like, the perception assistance component 805 may reduce the codebook extension to a region of interest (e.g., a subset of the codebook extension). In some aspects, the codebook extension may be expansive, because the codebook extension may include all phase shifter and amplitude control possibilities. In some aspects, the perception assistance component 805 may thus indicate a subset of the codebook extension (e.g., the region of interest) to be searched for final beam adaptation based on the sensed physical environment. Thus, as shown by reference numbers 820 and 825, the UE 120 may perform final beam adaptation based at least in part on searching a reduced codebook space for selection of final beam weights. More particularly, the UE 120 may project the adaptive beam weight calculations (e.g., $g_{ideal}$) onto the region of interest rather than the entire codebook extension. The UE 120 may select a beam from the region of interest that most closely aligns with the adaptive beam weight calculations (e.g., $g_{ideal}$), resulting in a selected beam to use (e.g., $g_{used}$) for further communications. In some aspects, the beamforming techniques described above may be performed in both the digital and analog domains, and thus is sometimes referred to as hybrid beamforming.

As indicated above, FIG. 8 is provided as an example. Other examples may differ from what is described with regard to FIG. 8.

Figure 9:
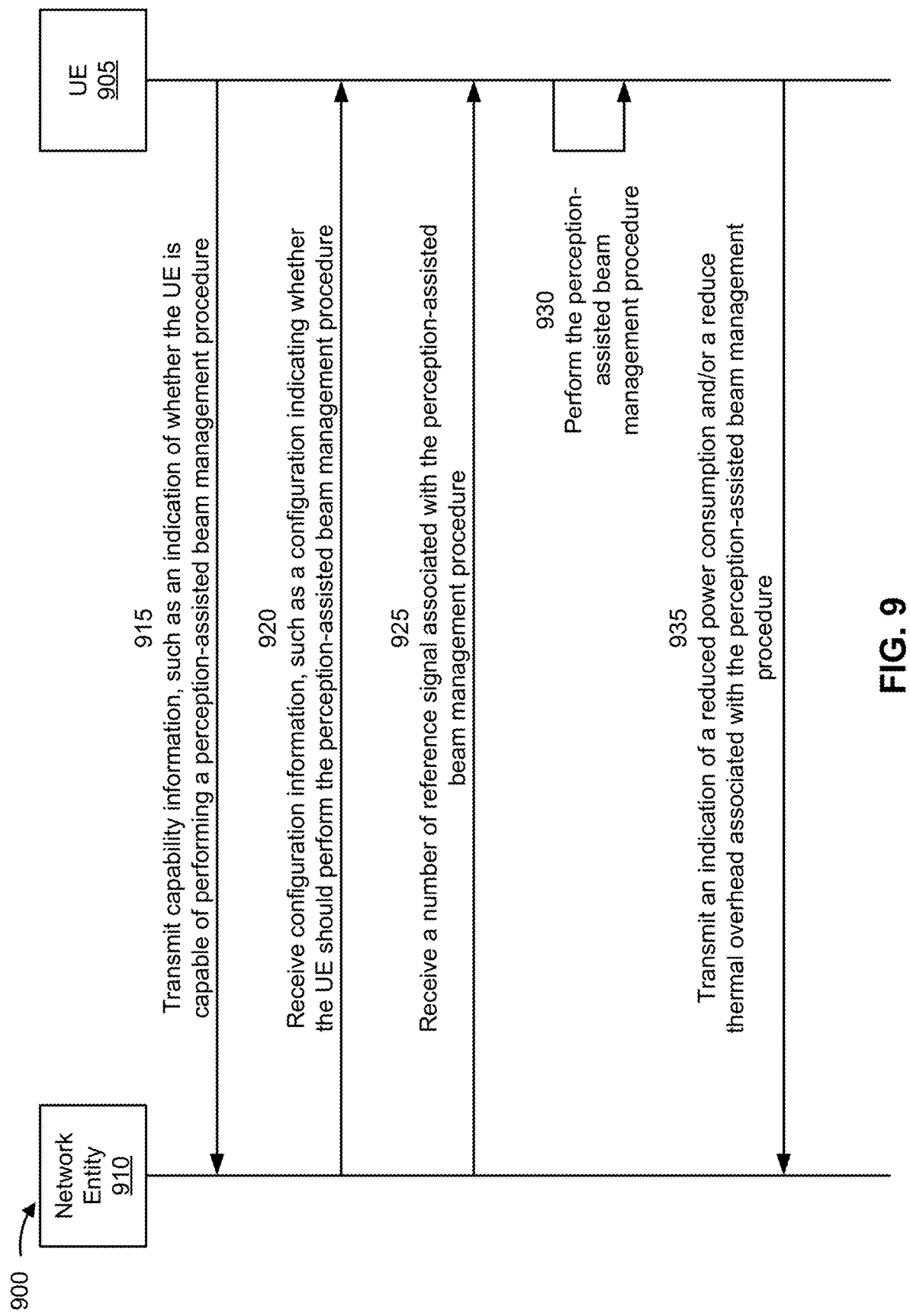
FIG. 9 is a diagram of an example associated with perception-assisted beam management procedures, in accordance with the present disclosure.

FIG. 9 is a diagram of an example 900 associated with perception-assisted beam management procedures, in accordance with the present disclosure. As shown in FIG. 9, a UE 905 (e.g., UE 120 and/or UE 705) may communicate with a network entity (e.g., a base station 110, a CU 310, a DU 330, an RU 340, network entity 710, or a similar network entity). In some aspects, the UE 905 and the network entity 910 may be part of a wireless network (e.g., wireless network 100). The UE 905 and the network entity 910 may have established a wireless connection prior to operations shown in FIG. 9. For example, the UE 905 and the network entity 910 may have established a wireless connection associated with beamforming communications, as described above.

As shown by reference number 915, the UE 905 may transmit, to the network entity 910, capability information. In some aspects, the capability information may indicate UE 905 support for perception-assisted beam management procedures. More particularly, the UE 905 may transmit, to the network entity 910, an indication of whether the UE 905 is capable of performing a perception-assisted beam management procedure. In some aspects, the perception-assisted beam management procedure may be associated with an adaptive beam weight learning procedure for hybrid beamforming at the UE 905, such as the perception-assisted adaptive beam weight learning procedure described in connection with FIGS. 7 and 8.

In some aspects, the UE 905 may transmit additional information and/or indications associated with the perception-assisted beam management procedure. For example, as described in connection with FIG. 8, the perception-assisted beam management procedure may be performed using a number of reference signals (e.g., CSI-RSs and/or SSBs) that is less than a number of reference signals associated with a non-perception-assisted beam management procedure. Accordingly, in some aspects, the indication of whether the UE 905 is capable of performing the perception-assisted beam management procedure may include an indication of a number of reference signals associated with performing adaptive beam weight learning associated with the perception-assisted beam management procedure. Moreover, as described in connection with FIG. 8, in some aspects, the perception-assisted beam management procedure may result in a reduced power consumption by the UE 905 and/or a reduced thermal overhead associated with the UE 905. Accordingly, in some aspects, the UE 905 may transmit, to the network entity 910, an indication of the reduced power consumption or the reduced thermal overhead associated with the perception-assisted beam management procedure.

Additionally, or alternatively, in some aspects, the UE 905 may transmit, to the network entity 910, an indication of an estimation error associated with adaptive beam weights associated with the perception-assisted beam management procedure. More particularly, the UE 905 may indicate to the network entity 910 that an estimation error associated with generating the adaptive beam weights described in connection with reference numbers 815-825 (e.g., the adaptive beam weights generated according to the perception-assisted beam management procedure) may be lower than an estimation error associated with generating adaptive beam weights described in connection with reference numbers 615-625 (e.g., the adaptive beam weights generated according to the non-perception-assisted beam management procedure). In some aspects, the capability information and/or indications and/or information associated with the perception-assisted beam management procedure described above in connection with reference number 915 may by transmitted to the network entity 910 by the UE 905 via one of a one of an RRC communication, a UCI communication, or a MAC-CE communication.

As shown by reference number 920, the UE 905 may receive, from the network entity 910, configuration information. In some aspects, the UE 905 may receive the configuration information via one or more of RRC signaling, one or more MAC-CEs, and/or DCI, among other examples. In some aspects, the configuration information may include an indication of one or more configuration parameters (e.g., already known to the UE 905 and/or previously indicated by the network entity 910 or other network device) for selection by the UE 905, and/or explicit configuration information for the UE 905 to use to configure the UE 905, among other examples. The UE may configure itself based at least in part on the configuration information. In some aspects, the UE may be configured to perform one or more operations described herein based at least in part on the configuration information.

In some aspects, the configuration information may include a configuration indicating whether the UE 905 should perform the perception-assisted beam management procedure, which may be based at least in part on the indication of whether the UE 905 is capable of performing the perception-assisted beam management procedure. For example, in response to receiving an indication that the UE 905 is capable of performing the perception-assisted beam management procedure (e.g., the UE 905 is equipped with the perception assistance component 805, or the like), the network entity 910 may configure the UE 905 to perform the perception-assisted beam management procedure described in connection with FIG. 8.

In aspects in which the UE 905 transmitted, to the network entity 910, the indication of the reduced power consumption or the reduced thermal overhead associated with the perception-assisted beam management procedure, the configuration indicating whether the UE 905 should perform the perception-assisted beam management procedure may be based at least in part on the indication of the reduced power consumption or the reduced thermal overhead. Put another way, the network entity 910 may configure the UE 905 to perform the perception-assisted beam management procedure in order to realize the indicated power consumption gains or thermal overhead gains. Similarly, in aspects in which the UE 905 transmitted, to the network entity 910, an indication of an estimation error associated with adaptive beam weights associated with the perception-assisted beam management procedure, the configuration indicating whether the UE 905 should perform the perception-assisted beam management procedure may be based at least in part on the indication of the estimation error associated with the adaptive beam weights. For example, the network entity 910 may determine an uplink data rate or the like is lower than a threshold, and the network entity 910 may thus configure the UE 905 to implement the perception-assisted beam management procedure to reduce error rates associated with channel estimation and thus improve link quality and/or uplink data rates.

The UE 905 may configure itself based at least in part on the configuration information. In some aspects, the UE 905 may be configured to perform one or more operations described herein based at least in part on the configuration information.

As shown by reference number 925, the UE 905 may receive, from the network entity 910, a number of reference signals associated with the perception-assisted beam management procedure. More particularly, the UE 905 may receive a number of CSI-RSs and/or SSBs to perform certain measurements (e.g., RSRP measurements) associated with the perception-assisted beam management procedure. As described above in connection with reference number 810, in some aspects, the UE 905 may perform such measurements with a reduced number of sensing beams as compared to a non-perception-assisted beam management procedure. In that regard, the number of reference signals received by the UE 905 may be less than a number of reference signals associated with a non-perception-assisted beam management procedure. For example, in some aspects, the number of reference signals associated with the non-perception-assisted beam management procedure may correspond to a square of an array dimension (e.g., $N^2$) associated with adaptive beam weights associated with the perception-assisted beam management procedure (e.g., an array dimension for which adaptive beam weights are learned), while the number of reference signals associated with the perception-assisted beam management procedure is less than the square of the array dimension associated with adaptive beam weights associated with the non-perception-assisted beam management procedure. Moreover, in aspects in which the UE 905 transmitted, to the network entity 910, the indication of the number of reference signals associated with performing beam weight learning associated with the perception-assisted beam management procedure, the number of reference signals received by the UE 905 may be based at least in part on the indication.

As shown by reference number 930, in some aspects, the UE 905 may perform the perception-assisted beam management procedure. For example, the UE 905 may perform the perception-assisted beam management procedure based at least in part on the reference signals described in connection with reference number 925. In some aspects, the UE 905 may determine adaptive beam weights associated with the perception-assisted beam management procedure, and the UE 905 quantize the adaptive beam weights to a reduced dimensional codebook space (e.g., the region of interest), as described in connection with reference numbers 815, 820, and 825 in FIG. 8. In such aspects, the reduced dimensional codebook space may be smaller than a codebook space (e.g., the codebook extension described in connection with FIG. 6 and FIG. 8) associated with a non-perception-assisted beam management procedure.

Additionally, or alternatively, in some aspects, quantizing the beam weights to the reduced dimensional codebook space may result in at least one of a reduced power consumption as compared to quantizing the beam weights to the codebook space, or a reduced thermal overhead as compared to quantizing the beam weights to the codebook space. In such aspects, the UE 905 may report the power savings and/or thermal overhead benefits to the network entity 910. More particularly, as shown by reference number 935, the UE 905 may transmit, to the network entity 910, an indication of the at least one of the reduced power consumption or the reduced thermal overhead.

Based at least in part on the UE 905 performing the perception-assisted beam management procedure described above, the UE 905 and/or the network entity 910 may conserve computing, power, network, and/or communication resources that may have otherwise been consumed traditional beam management procedures. For example, based at least in part on the UE 905 performing the perception-assisted beam management procedure, the UE 905 and the network entity 910 may establish communication beams using reduced reference signaling resulting in reduced power consumption, computation time, and thermal overhead, and/or communicate with a reduced error rate, which may conserve computing, power, network, and/or communication resources that may have otherwise been consumed to detect and/or correct communication errors.

As indicated above, FIG. 9 is provided as an example. Other examples may differ from what is described with respect to FIG. 9.

Figure 10:
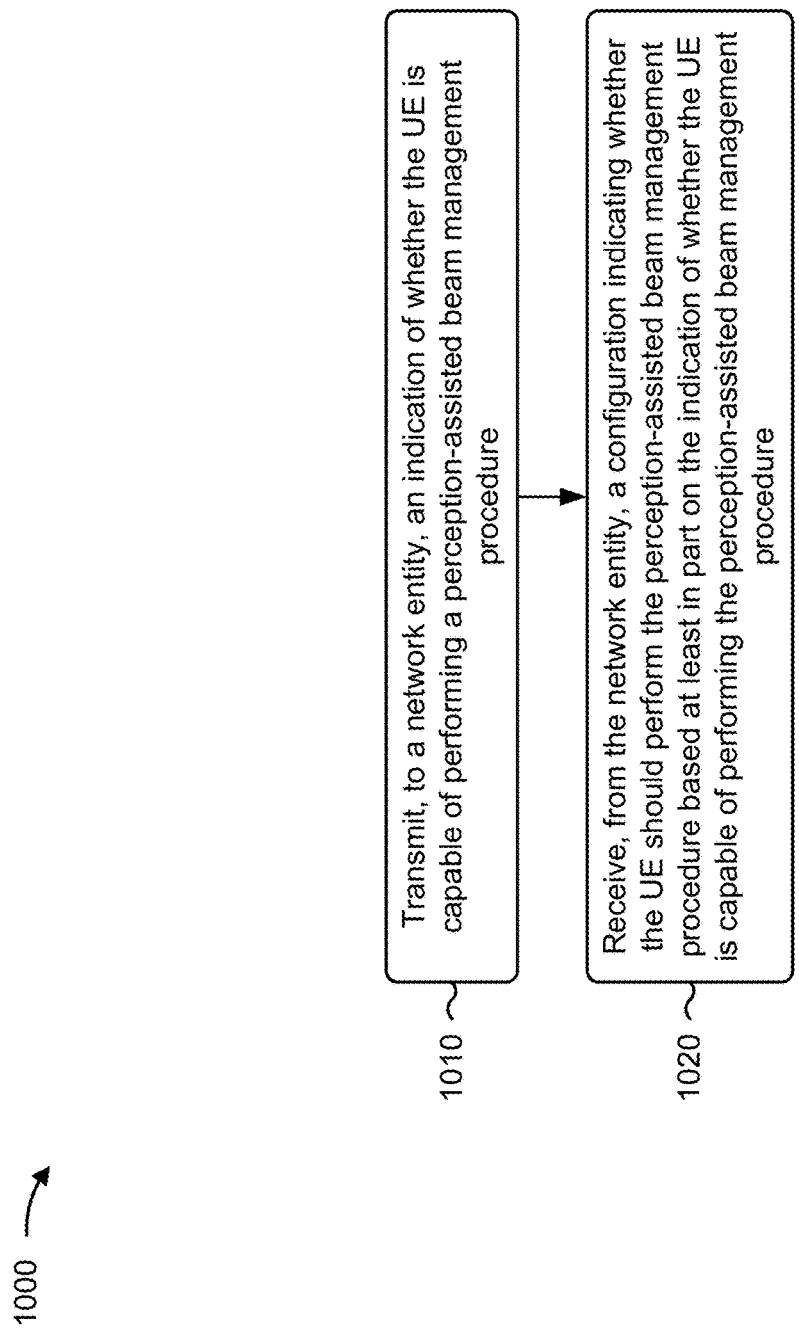
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 905) performs operations associated with a perception-assisted beam management procedure.

As shown in FIG. 10, in some aspects, process 1000 may include transmitting, to a network entity (e.g., network entity 910), an indication of whether the UE is capable of performing a perception-assisted beam management procedure (block 1010). For example, the UE (e.g., using communication manager 1208 and/or transmission component 1204, depicted in FIG. 12) may transmit, to a network entity, an indication of whether the UE is capable of performing a perception-assisted beam management procedure, as described above.

As further shown in FIG. 10, in some aspects, process 1000 may include receiving, from the network entity, a configuration indicating whether the UE should perform the perception-assisted beam management procedure based at least in part on the indication of whether the UE is capable of performing the perception-assisted beam management procedure (block 1020). For example, the UE (e.g., using communication manager 1208 and/or reception component 1202, depicted in FIG. 12) may receive, from the network entity, a configuration indicating whether the UE should perform the perception-assisted beam management procedure based at least in part on the indication of whether the UE is capable of performing the perception-assisted beam management procedure, as described above.

Process 1000 may include additional aspects, such as any single aspect or any combination of aspects described below and/or in connection with one or more other processes described elsewhere herein.

In a first aspect, the perception-assisted beam management procedure is associated with an adaptive beam weight learning procedure for hybrid beamforming at the UE.

In a second aspect, alone or in combination with the first aspect, the indication of whether the UE is capable of performing the perception-assisted beam management procedure is transmitted via one of an RRC communication, a UCI communication, or a MAC-CE communication.

In a third aspect, alone or in combination with one or more of the first and second aspects, the indication of whether the UE is capable of performing the perception-assisted beam management procedure includes an indication of a number of reference signals associated with performing adaptive beam weight learning associated with the perception-assisted beam management procedure.

In a fourth aspect, alone or in combination with one or more of the first through third aspects, process 1000 includes receiving, from the network entity, a number of reference signals associated with the perception-assisted beam management procedure, wherein the number of reference signals associated with the perception-assisted beam management procedure is less than a number of reference signals associated with a non-perception-assisted beam management procedure, and performing the perception-assisted beam management procedure based at least in part on the reference signals associated with the perception-assisted beam management procedure.

In a fifth aspect, alone or in combination with one or more of the first through fourth aspects, process 1000 includes receiving, from the network entity, a number of reference signals associated with the perception-assisted beam management procedure, wherein the number of reference signals associated with the perception-assisted beam management procedure is less than a square of an array dimension associated with adaptive beam weights associated with a non-perception-assisted beam management procedure, and performing the perception-assisted beam management procedure based at least in part on the reference signals associated with the perception-assisted beam management procedure.

In a sixth aspect, alone or in combination with one or more of the first through fifth aspects, process 1000 includes determining adaptive beam weights associated with the perception-assisted beam management procedure, and quantizing the adaptive beam weights to a reduced dimensional codebook space.

In a seventh aspect, alone or in combination with one or more of the first through sixth aspects, the reduced dimensional codebook space is smaller than a codebook space associated with a non-perception-assisted beam management procedure.

In an eighth aspect, alone or in combination with one or more of the first through seventh aspects, quantizing the adaptive beam weights to the reduced dimensional codebook space results in at least one of a reduced power consumption as compared to quantizing the adaptive beam weights to the codebook space, or a reduced thermal overhead as compared to quantizing the adaptive beam weights to the codebook space.

In a ninth aspect, alone or in combination with one or more of the first through eighth aspects, process 1000 includes transmitting, to the network entity, an indication of the at least one of the reduced power consumption or the reduced thermal overhead.

In a tenth aspect, alone or in combination with one or more of the first through ninth aspects, process 1000 includes transmitting, to the network entity, an indication of a reduced power consumption associated with the perception-assisted beam management procedure, or a reduced thermal overhead associated with the perception-assisted beam management procedure, wherein the configuration indicating whether the UE should perform the perception-assisted beam management procedure is further received based at least in part on the indication of the reduced power consumption or the reduced thermal overhead.

In an eleventh aspect, alone or in combination with one or more of the first through tenth aspects, process 1000 includes transmitting, to the network entity, an indication of an estimation error associated with adaptive beam weights associated with the perception-assisted beam management procedure, wherein the configuration indicating whether the UE should perform the perception-assisted beam management procedure is further received based at least in part on the indication of the estimation error associated with the adaptive beam weights.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
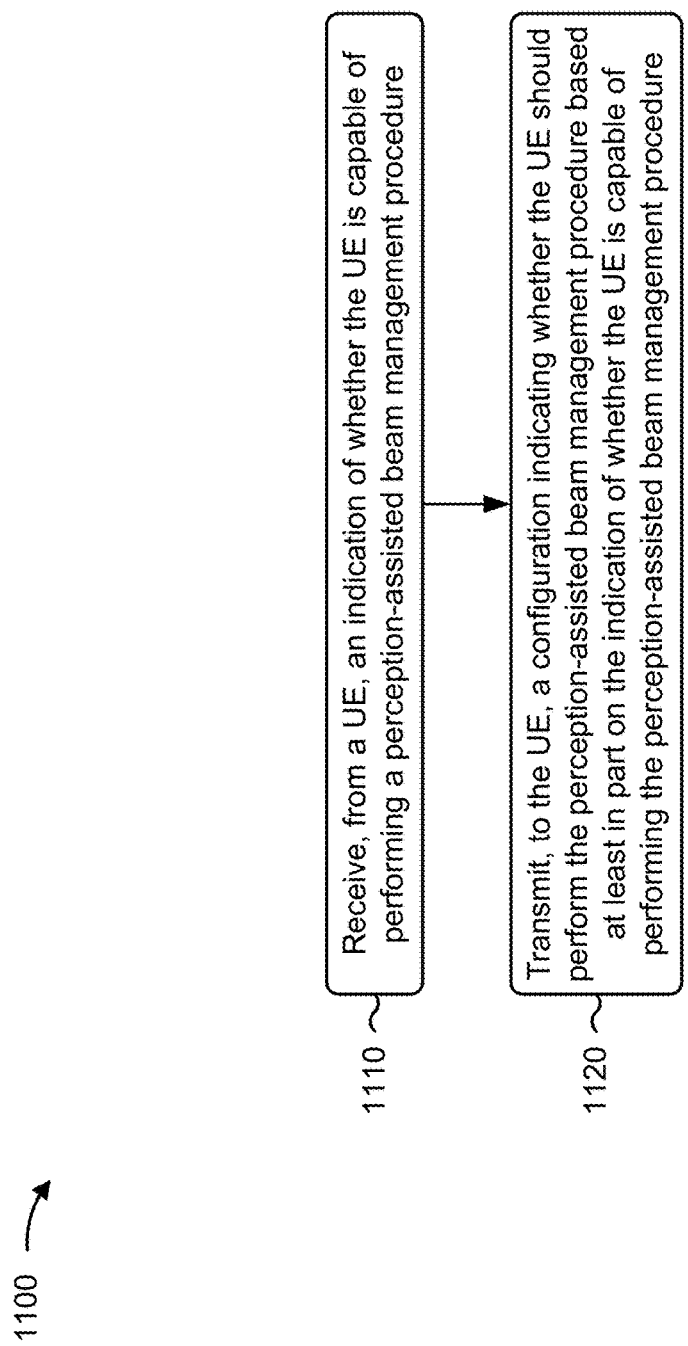
FIG. 11 is a diagram illustrating an example process performed, for example, by a network entity, in accordance with the present disclosure.

FIG. 11 is a diagram illustrating an example process 1100 performed, for example, by a network entity, in accordance with the present disclosure. Example process 1100 is an example where the network entity (e.g., network entity 910) performs operations associated with a perception-assisted beam management procedure.

As shown in FIG. 11, in some aspects, process 1100 may include receiving, from a UE (e.g., UE 905), an indication of whether the UE is capable of performing a perception-assisted beam management procedure (block 1110). For example, the network entity (e.g., using communication manager 1308 and/or reception component 1302, depicted in FIG. 13) may receive, from a UE, an indication of whether the UE is capable of performing a perception-assisted beam management procedure, as described above.

As further shown in FIG. 11, in some aspects, process 1100 may include transmitting, to the UE, a configuration indicating whether the UE should perform the perception-assisted beam management procedure based at least in part on the indication of whether the UE is capable of performing the perception-assisted beam management procedure (block 1120). For example, the network entity (e.g., using communication manager 1308 and/or transmission component 1304, depicted in FIG. 13) may transmit, to the UE, a configuration indicating whether the UE should perform the perception-assisted beam management procedure based at least in part on the indication of whether the UE is capable of performing the perception-assisted beam management procedure, as described above.

Process 1100 may include additional aspects, such as any single aspect or any combination of aspects described below and/or in connection with one or more other processes described elsewhere herein.

In a first aspect, the perception-assisted beam management procedure is associated with an adaptive beam weight learning procedure for hybrid beamforming at the UE.

In a second aspect, alone or in combination with the first aspect, the indication of whether the UE is capable of performing the perception-assisted beam management procedure is received via one of an RRC communication, a UCI communication, or a MAC-CE communication.

In a third aspect, alone or in combination with one or more of the first and second aspects, the indication of whether the UE is capable of performing the perception-assisted beam management procedure includes an indication of a number of reference signals associated with performing adaptive beam weight learning associated with the perception-assisted beam management procedure.

In a fourth aspect, alone or in combination with one or more of the first through third aspects, process 1100 includes transmitting, to the UE, a number of reference signals associated with the perception-assisted beam management procedure, wherein the number of reference signals associated with the perception-assisted beam management procedure is less than a number of reference signals associated with a non-perception-assisted beam management procedure.

In a fifth aspect, alone or in combination with one or more of the first through fourth aspects, process 1100 includes transmitting, to the UE, a number of reference signals associated with the perception-assisted beam management procedure, wherein the number of reference signals associated with the perception-assisted beam management procedure is less than a square of an array dimension associated with adaptive beam weights associated with a non-perception-assisted beam management procedure.

In a sixth aspect, alone or in combination with one or more of the first through fifth aspects, the perception-assisted beam management procedure is associated with quantizing adaptive beam weights to a reduced dimensional codebook space.

In a seventh aspect, alone or in combination with one or more of the first through sixth aspects, the reduced dimensional codebook space is smaller than a codebook space associated with a non-perception-assisted beam management procedure.

In an eighth aspect, alone or in combination with one or more of the first through seventh aspects, quantizing the adaptive beam weights to the reduced dimensional codebook space results in at least one of a reduced power consumption as compared to quantizing the adaptive beam weights to the codebook space, or a reduced thermal overhead as compared to quantizing the adaptive beam weights to the codebook space.

In a ninth aspect, alone or in combination with one or more of the first through eighth aspects, process 1100 includes receiving, from the UE, an indication of the at least one of the reduced power consumption or the reduced thermal overhead.

In a tenth aspect, alone or in combination with one or more of the first through ninth aspects, process 1100 includes receiving, from the UE, an indication of a reduced power consumption associated with the perception-assisted beam management procedure, or a reduced thermal overhead associated with the perception-assisted beam management procedure, wherein the configuration indicating whether the UE should perform the perception-assisted beam management procedure is further transmitted based at least in part on the indication of the reduced power consumption or the reduced thermal overhead.

In an eleventh aspect, alone or in combination with one or more of the first through tenth aspects, process 1100 includes receiving, from the UE, an indication of an estimation error associated with adaptive beam weights associated with the perception-assisted beam management procedure, wherein the configuration indicating whether the UE should perform the perception-assisted beam management procedure is further transmitted based at least in part on the indication of the estimation error associated with the adaptive beam weights.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
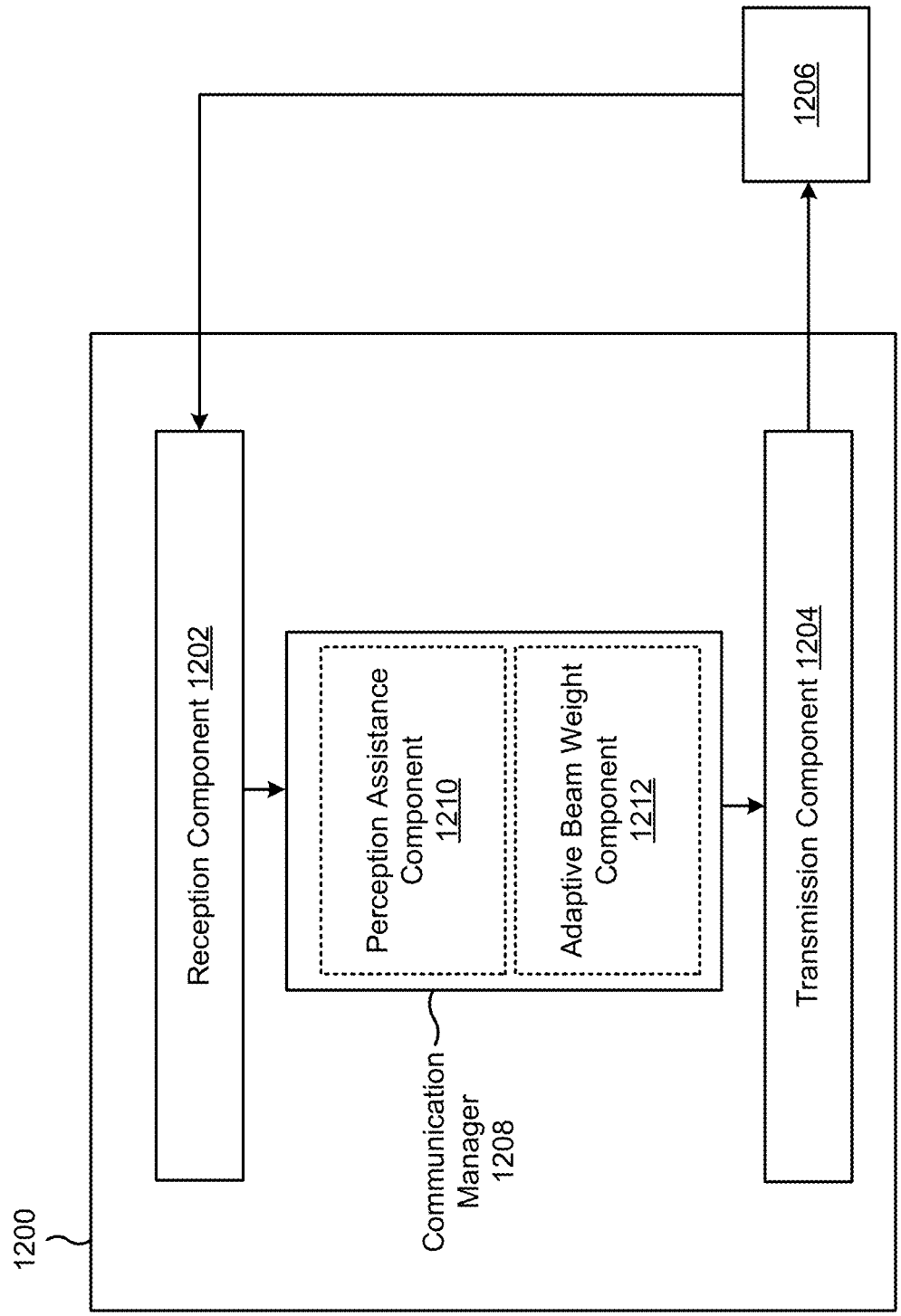
FIG. 12 is a diagram of an example apparatus for wireless communication, in accordance with the present invention.

FIG. 12 is a diagram of an example apparatus 1200 for wireless communication, in accordance with the present invention. The apparatus 1200 may be a UE (e.g., UE 905), or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 1208 (e.g., communication manager 140). The communication manager 1208 may include one or more of a perception assistance component 1210 (e.g., perception assistance component 805), or an adaptive beam weight component 1212, among other examples.

In some aspects, the apparatus 1200 may be configured to perform one or more operations described herein in connection with FIGS. 7-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE 120 described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE 120 described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE 120 described in connection with FIG. 2. In some aspects, the transmission component 1204 may be co-located with the reception component 1202 in a transceiver.

The transmission component 1204 and/or the perception assistance component 1210 may transmit, to a network entity (e.g., network entity 910), an indication of whether the UE is capable of performing a perception-assisted beam management procedure. The reception component 1202 may receive, from the network entity, a configuration indicating whether the UE should perform the perception-assisted beam management procedure based at least in part on the indication of whether the UE is capable of performing the perception-assisted beam management procedure.

The reception component 1202 may receive, from the network entity, a number of reference signals associated with the perception-assisted beam management procedure, wherein the number of reference signals associated with the perception-assisted beam management procedure is less than a number of reference signals associated with a non-perception-assisted beam management procedure.

The perception assistance component 1210 and/or the adaptive beam weight component 1212 may perform the perception-assisted beam management procedure based at least in part on the reference signals.

The reception component 1202 may receive, from the network entity, a number of reference signals associated with the perception-assisted beam management procedure, wherein the number of reference signals associated with the perception-assisted beam management procedure is less than a square of an array dimension associated with adaptive beam weights associated with a non-perception-assisted beam management procedure.

The adaptive beam weight component 1212 may determine adaptive beam weights associated with the perception-assisted beam management procedure.

The adaptive beam weight component 1212 may quantize the beam weights to a reduced dimensional codebook space.

The transmission component 1204 may transmit, to the network entity, an indication of the at least one of the reduced power consumption or the reduced thermal overhead. In some aspects, the configuration indicating whether the UE should perform the perception-assisted beam management procedure is further received based at least in part on the indication of the reduced power consumption or the reduced thermal overhead.

The transmission component 1204 may transmit, to the network entity, an indication of an estimation error associated with adaptive beam weights associated with the perception-assisted beam management procedure, wherein the configuration indicating whether the UE should perform the perception-assisted beam management procedure is further received based at least in part on the indication of the estimation error associated with the adaptive beam weights.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
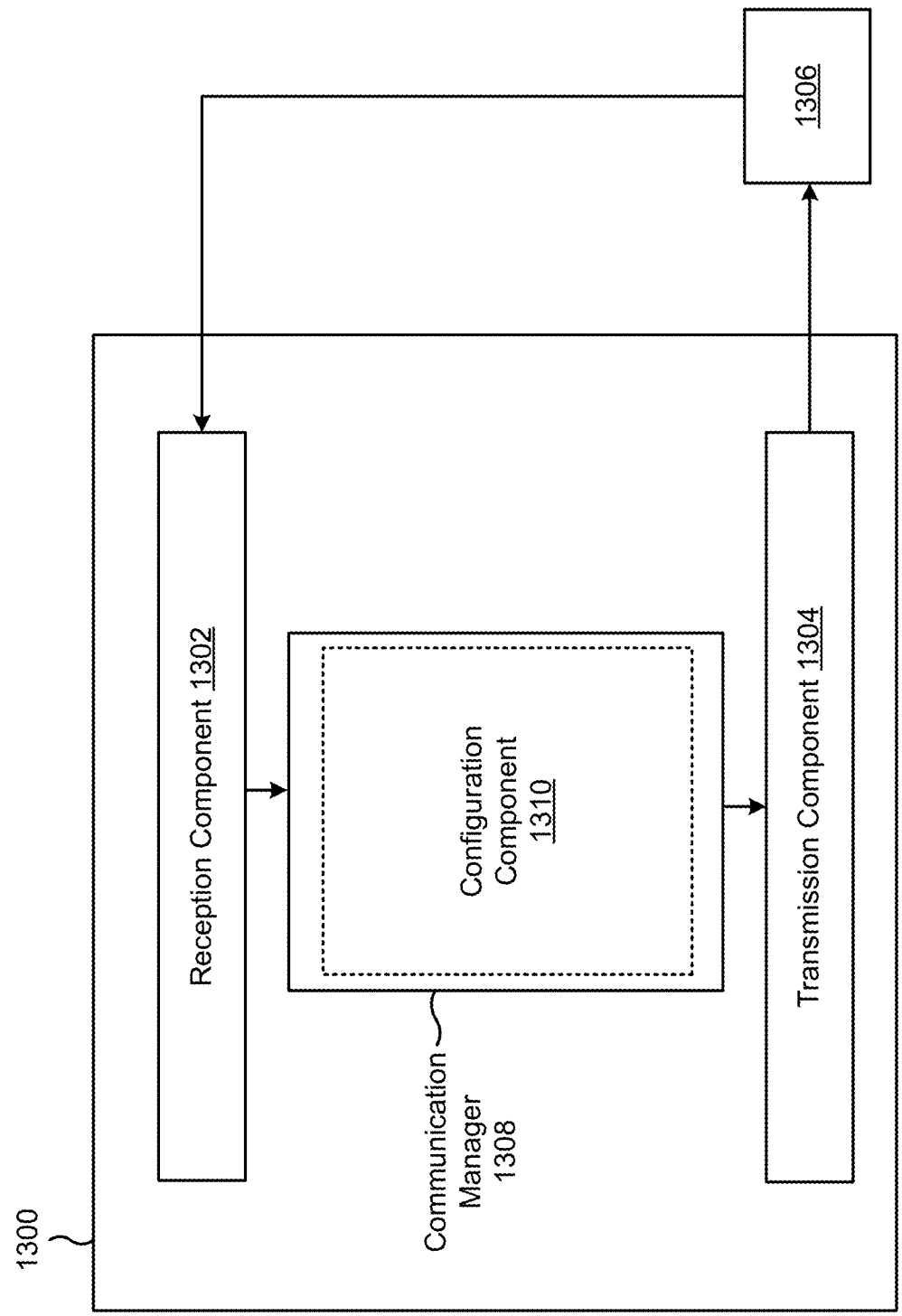
FIG. 13 is a diagram of an example apparatus for wireless communication, in accordance with the present invention.

FIG. 13 is a diagram of an example apparatus 1300 for wireless communication, in accordance with the present invention. The apparatus 1300 may be a network entity (e.g., network entity 910), or a network entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 1308 (e.g., communication manager 150). The communication manager 1308 may include a configuration component 1310, among other examples.

In some aspects, the apparatus 1300 may be configured to perform one or more operations described herein in connection with FIGS. 7-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the base station 110 described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the base station 110 described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station 110 described in connection with FIG. 2. In some aspects, the transmission component 1304 may be co-located with the reception component 1302 in a transceiver.

The reception component 1302 may receive, from a UE (e.g., UE 905), an indication of whether the UE is capable of performing a perception-assisted beam management procedure. The transmission component 1304 and/or the configuration component 1310 may transmit, to the UE, a configuration indicating whether the UE should perform the perception-assisted beam management procedure based at least in part on the indication of whether the UE is capable of performing the perception-assisted beam management procedure.

The transmission component 1304 may transmit, to the UE, a number of reference signals associated with the perception-assisted beam management procedure, wherein the number of reference signals associated with the perception-assisted beam management procedure is less than a number of reference signals associated with a non-perception-assisted beam management procedure.

The transmission component 1304 may transmit, to the UE, a number of reference signals associated with the perception-assisted beam management procedure, wherein the number of reference signals associated with the perception-assisted beam management procedure is less than a square of an array dimension associated with adaptive beam weights associated with a non-perception-assisted beam management procedure.

The reception component 1302 may receive, from the UE, an indication of the at least one of the reduced power consumption or the reduced thermal overhead. In some aspects, the configuration indicating whether the UE should perform the perception-assisted beam management procedure is further transmitted based at least in part on the indication of the reduced power consumption or the reduced thermal overhead.

The reception component 1302 may receive, from the UE, an indication of an estimation error associated with adaptive beam weights associated with the perception-assisted beam management procedure, wherein the configuration indicating whether the UE should perform the perception-assisted beam management procedure is further transmitted based at least in part on the indication of the estimation error associated with the adaptive beam weights.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a UE, comprising: transmitting, to a network entity, an indication of whether the UE is capable of performing a perception-assisted beam management procedure; and receiving, from the network entity, a configuration indicating whether the UE should perform the perception-assisted beam management procedure based at least in part on the indication of whether the UE is capable of performing the perception-assisted beam management procedure.

Aspect 2: The method of Aspect 1, wherein the perception-assisted beam management procedure is associated with an adaptive beam weight learning procedure for hybrid beamforming at the UE.

Aspect 3: The method of any of Aspects 1-2, wherein the indication of whether the UE is capable of performing the perception-assisted beam management procedure is transmitted via one of an RRC communication, a UCI communication, or a MAC-CE communication.

Aspect 4: The method of any of Aspects 1-3, wherein the indication of whether the UE is capable of performing the perception-assisted beam management procedure includes an indication of a number of reference signals associated with performing adaptive beam weight learning associated with the perception-assisted beam management procedure.

Aspect 5: The method of any of Aspects 1-4, further comprising: receiving, from the network entity, a number of reference signals associated with the perception-assisted beam management procedure, wherein the number of reference signals associated with the perception-assisted beam management procedure is less than a number of reference signals associated with a non-perception-assisted beam management procedure; and performing the perception-assisted beam management procedure based at least in part on the reference signals.

Aspect 6: The method of any of Aspects 1-5, further comprising: receiving, from the network entity, a number of reference signals associated with the perception-assisted beam management procedure, wherein the number of reference signals associated with the perception-assisted beam management procedure is less than a square of an array dimension associated with adaptive beam weights associated with a non-perception-assisted beam management procedure; and performing the perception-assisted beam management procedure based at least in part on the reference signals.

Aspect 7: The method of any of Aspects 1-6, further comprising: determining adaptive beam weights associated with the perception-assisted beam management procedure; and quantizing the beam weights to a reduced dimensional codebook space.

Aspect 8: The method of Aspect 7, wherein the reduced dimensional codebook space is smaller than a codebook space associated with a non-perception-assisted beam management procedure.

Aspect 9: The method of Aspect 8, wherein quantizing the beam weights to the reduced dimensional codebook space results in at least one of a reduced power consumption as compared to quantizing the beam weights to the codebook space, or a reduced thermal overhead as compared to quantizing the beam weights to the codebook space.

Aspect 10: The method of Aspect 9, further comprising transmitting, to the network entity, an indication of the at least one of the reduced power consumption or the reduced thermal overhead.

Aspect 11: The method of any of Aspects 1-10, further comprising transmitting, to the network entity, an indication of a reduced power consumption associated with the perception-assisted beam management procedure, or a reduced thermal overhead associated with the perception-assisted beam management procedure, wherein the configuration indicating whether the UE should perform the perception-assisted beam management procedure is further received based at least in part on the indication of the reduced power consumption or the reduced thermal overhead.

Aspect 12: The method of any of Aspects 1-11, further comprising transmitting, to the network entity, an indication of an estimation error associated with adaptive beam weights associated with the perception-assisted beam management procedure, wherein the configuration indicating whether the UE should perform the perception-assisted beam management procedure is further received based at least in part on the indication of the estimation error associated with the adaptive beam weights.

Aspect 13: A method of wireless communication performed by a network entity, comprising: receiving, from a UE, an indication of whether the UE is capable of performing a perception-assisted beam management procedure; and transmitting, to the UE, a configuration indicating whether the UE should perform the perception-assisted beam management procedure based at least in part on the indication of whether the UE is capable of performing the perception-assisted beam management procedure.

Aspect 14: The method of Aspect 13, wherein the perception-assisted beam management procedure is associated with an adaptive beam weight learning procedure for hybrid beamforming at the UE.

Aspect 15: The method of any of Aspects 13-14, wherein the indication of whether the UE is capable of performing the perception-assisted beam management procedure is received via one of an RRC communication, a UCI communication, or a MAC-CE communication.

Aspect 16: The method of any of Aspects 13-15, wherein the indication of whether the UE is capable of performing the perception-assisted beam management procedure includes an indication of a number of reference signals associated with performing adaptive beam weight learning associated with the perception-assisted beam management procedure.

Aspect 17: The method of any of Aspects 13-16, further comprising transmitting, to the UE, a number of reference signals associated with the perception-assisted beam management procedure, wherein the number of reference signals associated with the perception-assisted beam management procedure is less than a number of reference signals associated with a non-perception-assisted beam management procedure.

Aspect 18: The method of any of Aspects 13-17, further comprising transmitting, to the UE, a number of reference signals associated with the perception-assisted beam management procedure, wherein the number of reference signals associated with the perception-assisted beam management procedure is less than a square of an array dimension associated with adaptive beam weights associated with a non-perception-assisted beam management procedure.

Aspect 19: The method of any of Aspects 13-18, wherein the perception-assisted beam management procedure is associated with quantizing beam weights to a reduced dimensional codebook space.

Aspect 20: The method of Aspect 19, wherein the reduced dimensional codebook space is smaller than a codebook space associated with a non-perception-assisted beam management procedure.

Aspect 21: The method of Aspect 20, wherein quantizing the beam weights to the reduced dimensional codebook space results in at least one of a reduced power consumption as compared to quantizing the beam weights to the codebook space, or a reduced thermal overhead as compared to quantizing the beam weights to the codebook space.

Aspect 22: The method of Aspect 21, further comprising receiving, from the UE, an indication of the at least one of the reduced power consumption or the reduced thermal overhead.

Aspect 23: The method of any of Aspects 13-22, further comprising receiving, from the UE, an indication of a reduced power consumption associated with the perception-assisted beam management procedure, or a reduced thermal overhead associated with the perception-assisted beam management procedure, wherein the configuration indicating whether the UE should perform the perception-assisted beam management procedure is further transmitted based at least in part on the indication of the reduced power consumption or the reduced thermal overhead.

Aspect 24: The method of any of Aspects 13-23, further comprising receiving, from the UE, an indication of an estimation error associated with adaptive beam weights associated with the perception-assisted beam management procedure, wherein the configuration indicating whether the UE should perform the perception-assisted beam management procedure is further transmitted based at least in part on the indication of the estimation error associated with the adaptive beam weights.

Aspect 25: An apparatus for wireless communication at a device, comprising a processor; memory coupled with the processor; and instructions stored in the memory and executable by the processor to cause the apparatus to perform the method of one or more of Aspects 1-12.

Aspect 26: A device for wireless communication, comprising a memory and one or more processors coupled to the memory, the one or more processors configured to perform the method of one or more of Aspects 1-12.

Aspect 27: An apparatus for wireless communication, comprising at least one means for performing the method of one or more of Aspects 1-12.

Aspect 28: A non-transitory computer-readable medium storing code for wireless communication, the code comprising instructions executable by a processor to perform the method of one or more of Aspects 1-12.

Aspect 29: A non-transitory computer-readable medium storing a set of instructions for wireless communication, the set of instructions comprising one or more instructions that, when executed by one or more processors of a device, cause the device to perform the method of one or more of Aspects 1-12.

Aspect 30: An apparatus for wireless communication at a device, comprising a processor; memory coupled with the processor; and instructions stored in the memory and executable by the processor to cause the apparatus to perform the method of one or more of Aspects 13-24.

Aspect 31: A device for wireless communication, comprising a memory and one or more processors coupled to the memory, the one or more processors configured to perform the method of one or more of Aspects 13-24.

Aspect 32: An apparatus for wireless communication, comprising at least one means for performing the method of one or more of Aspects 13-24.

Aspect 33: A non-transitory computer-readable medium storing code for wireless communication, the code comprising instructions executable by a processor to perform the method of one or more of Aspects 13-24.

Aspect 34: A non-transitory computer-readable medium storing a set of instructions for wireless communication, the set of instructions comprising one or more instructions that, when executed by one or more processors of a device, cause the device to perform the method of one or more of Aspects 13-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
   transmit, to a network entity, an indication of whether the UE is capable of performing a perception-assisted beam management procedure and an indication of an estimation error associated with adaptive beam weights associated with the perception-assisted beam management procedure, wherein the perception-assisted beam management procedure is associated with an adaptive beam weight learning procedure for hybrid beamforming at the UE, performed in both the digital and analog domains, that includes selecting a beam from a region of interest that most closely aligns with the adaptive beam weights; and
   receive, from the network entity, a configuration indicating whether the UE should perform the perception-assisted beam management procedure based at least in part on the indication of whether the UE is capable of performing the perception-assisted beam management procedure and on the indication of the estimation error associated with the adaptive beam weights.

2. The apparatus of claim 1, wherein the indication of whether the UE is capable of performing the perception-assisted beam management procedure is transmitted via one of a radio resource control (RRC) communication, an uplink control information (UCI) communication, or a medium access control (MAC) control element (MAC-CE) communication.

3. The apparatus of claim 1, wherein the indication of whether the UE is capable of performing the perception-assisted beam management procedure includes an indication of a number of reference signals associated with performing adaptive beam weight learning associated with the perception-assisted beam management procedure.

4. The apparatus of claim 1, wherein the one or more processors are further configured to:
   receive, from the network entity, a number of reference signals associated with the perception-assisted beam management procedure, wherein the number of reference signals associated with the perception-assisted beam management procedure is less than a number of reference signals associated with a non-perception-assisted beam management procedure; and perform the perception-assisted beam management procedure based at least in part on the reference signals associated with the perception-assisted beam management procedure.

5. The apparatus of claim 1, wherein the one or more processors are further configured to:
receive, from the network entity, a number of reference signals associated with the perception-assisted beam management procedure, wherein the number of reference signals associated with the perception-assisted beam management procedure is less than a square of an array dimension associated with adaptive beam weights associated with a non-perception-assisted beam management procedure; and
perform the perception-assisted beam management procedure based at least in part on the reference signals associated with the perception-assisted beam management procedure.

6. The apparatus of claim 1, wherein the one or more processors are further configured to:
determine the adaptive beam weights associated with the perception-assisted beam management procedure; and
quantize the adaptive beam weights to a reduced dimensional codebook space.

7. The apparatus of claim 6, wherein the reduced dimensional codebook space is smaller than a codebook space associated with a non-perception-assisted beam management procedure.

8. The apparatus of claim 7, wherein quantizing the adaptive beam weights to the reduced dimensional codebook space results in at least one of a reduced power consumption as compared to quantizing the adaptive beam weights to the codebook space, or a reduced thermal overhead as compared to quantizing the adaptive beam weights to the codebook space.

9. The apparatus of claim 8, wherein the one or more processors are further configured to transmit, to the network entity, an indication of the at least one of the reduced power consumption or the reduced thermal overhead.

10. The apparatus of claim 1, wherein the one or more processors are further configured to transmit, to the network entity, an indication of a reduced power consumption associated with the perception-assisted beam management procedure, or a reduced thermal overhead associated with the perception-assisted beam management procedure, wherein the configuration indicating whether the UE should perform the perception-assisted beam management procedure is further received based at least in part on the indication of the reduced power consumption or the reduced thermal overhead.

11. An apparatus for wireless communication at a network entity, comprising:
a memory; and
one or more processors, coupled to the memory, configured to:
receive, from a user equipment (UE), an indication of whether the UE is capable of performing a perception-assisted beam management procedure and an indication of an estimation error associated with adaptive beam weights associated with the perception-assisted beam management procedure, wherein the perception-assisted beam management procedure is associated with an adaptive beam weight learning procedure for hybrid beamforming at the UE, performed in both the digital and analog domains, that includes selecting a beam from a region of interest that most closely aligns with the adaptive beam weights; and
transmit, to the UE, a configuration indicating whether the UE should perform the perception-assisted beam management procedure based at least in part on the indication of whether the UE is capable of performing the perception-assisted beam management procedure and on the indication of the estimation error associated with the adaptive beam weights.

12. The apparatus of claim 11, wherein the indication of whether the UE is capable of performing the perception-assisted beam management procedure is received via one of a radio resource control (RRC) communication, an uplink control information (UCI) communication, or a medium access control (MAC) control element (MAC-CE) communication.

13. The apparatus of claim 11, wherein the indication of whether the UE is capable of performing the perception-assisted beam management procedure includes an indication of a number of reference signals associated with performing adaptive beam weight learning associated with the perception-assisted beam management procedure.

14. The apparatus of claim 11, wherein the one or more processors are further configured to transmit, to the UE, a number of reference signals associated with the perception-assisted beam management procedure, wherein the number of reference signals associated with the perception-assisted beam management procedure is less than a number of reference signals associated with a non-perception-assisted beam management procedure.

15. The apparatus of claim 11, wherein the one or more processors are further configured to transmit, to the UE, a number of reference signals associated with the perception-assisted beam management procedure, wherein the number of reference signals associated with the perception-assisted beam management procedure is less than a square of an array dimension associated with adaptive beam weights associated with a non-perception-assisted beam management procedure.

16. The apparatus of claim 11, wherein the perception-assisted beam management procedure is associated with quantizing the adaptive beam weights to a reduced dimensional codebook space.

17. The apparatus of claim 16, wherein the reduced dimensional codebook space is smaller than a codebook space associated with a non-perception-assisted beam management procedure.

18. The apparatus of claim 17, wherein quantizing the adaptive beam weights to the reduced dimensional codebook space results in at least one of a reduced power consumption as compared to quantizing the adaptive beam weights to the codebook space, or a reduced thermal overhead as compared to quantizing the adaptive beam weights to the codebook space.

19. The apparatus of claim 18, wherein the one or more processors are further configured to receive, from the UE, an indication of the at least one of the reduced power consumption or the reduced thermal overhead.

20. The apparatus of claim 11, wherein the one or more processors are further configured to receive, from the UE, an indication of a reduced power consumption associated with the perception-assisted beam management procedure, or a reduced thermal overhead associated with the perception-assisted beam management procedure, wherein the configuration indicating whether the UE should perform the perception-assisted beam management procedure is further transmitted based at least in part on the indication of the reduced power consumption or the reduced thermal overhead.

21. A method of wireless communication performed by a user equipment (UE), comprising:
   transmitting, to a network entity, an indication of whether the UE is capable of performing a perception-assisted beam management procedure and an indication of an estimation error associated with adaptive beam weights associated with the perception-assisted beam management procedure, wherein the perception-assisted beam management procedure is associated with an adaptive beam weight learning procedure for hybrid beamforming at the UE, performed in both the digital and analog domains, that includes selecting a beam from a region of interest that most closely aligns with the adaptive beam weights; and
   receiving, from the network entity, a configuration indicating whether the UE should perform the perception-assisted beam management procedure based at least in part on the indication of whether the UE is capable of performing the perception-assisted beam management procedure and on the indication of the estimation error associated with the adaptive beam weights.

22. The method of claim 21, further comprising:
   receiving, from the network entity, a number of reference signals associated with the perception-assisted beam management procedure, wherein the number of reference signals associated with the perception-assisted beam management procedure is less than a number of reference signals associated with a non-perception-assisted beam management procedure; and
   performing the perception-assisted beam management procedure based at least in part on the reference signals associated with the perception-assisted beam management procedure.

23. The method of claim 21, further comprising:
   determining the adaptive beam weights associated with the perception-assisted beam management procedure; and
   quantizing the adaptive beam weights to a reduced dimensional codebook space.

24. A method of wireless communication performed by a network entity, comprising:
   receiving, from a user equipment (UE), an indication of whether the UE is capable of performing a perception-assisted beam management procedure and an indication of an estimation error associated with adaptive beam weights associated with the perception-assisted beam management procedure, wherein the perception-assisted beam management procedure is associated with an adaptive beam weight learning procedure for hybrid beamforming at the UE, performed in both the digital and analog domains, that includes selecting a beam from a region of interest that most closely aligns with the adaptive beam weights; and
   transmitting, to the UE, a configuration indicating whether the VE should perform the perception-assisted beam management procedure based at least in part on the indication of whether the UE is capable of performing the perception-assisted beam management procedure and on the indication of the estimation error associated with the adaptive beam weights.

* * * * *